United States Patent
Fujita et al.

(10) Patent No.: US 7,830,141 B2
(45) Date of Patent: Nov. 9, 2010

(54) FILM THICKNESS MEASURING APPARATUS AND FILM THICKNESS MEASURING METHOD

(75) Inventors: Takashi Fujita, Tokyo (JP); Toshiyuki Yokoyama, Tokyo (JP); Keita Kitade, Tokyo (JP)

(73) Assignee: Tokyo Seimitsu Co., Ltd., Tokyo (JP)

( * ) Notice: Subject to any disclaimer, the term of this patent is extended or adjusted under 35 U.S.C. 154(b) by 0 days.

(21) Appl. No.: 12/319,403

(22) Filed: Jan. 7, 2009

(65) Prior Publication Data

US 2009/0256558 A1 Oct. 15, 2009

(30) Foreign Application Priority Data

Feb. 7, 2008 (JP) .............................. 2008-027764

(51) Int. Cl.
*G01B 7/06* (2006.01)
*G01R 33/12* (2006.01)
(52) U.S. Cl. ....................................... 324/229; 324/239
(58) Field of Classification Search ............ 324/207.26, 324/222, 228, 229, 230, 231, 234, 239
See application file for complete search history.

(56) References Cited

U.S. PATENT DOCUMENTS

| 5,017,869 A * | 5/1991 | Oliver ........................ 324/230 |
| 5,559,428 A | 9/1996 | Li et al. ....................... 324/71.5 |
| 6,700,370 B2 | 3/2004 | Chen et al. ................... 324/230 |
| 7,046,001 B2 | 5/2006 | Tada et al. .................... 324/230 |
| 7,078,894 B2 * | 7/2006 | Tada et al. .................... 324/230 |
| 2006/0214657 A1 | 9/2006 | Tada et al. .................... 324/230 |
| 2007/0103150 A1 | 5/2007 | Tada et al. .................... 324/229 |

FOREIGN PATENT DOCUMENTS

JP          2005-227256       8/2005

\* cited by examiner

*Primary Examiner*—Kenneth J Whittington
(74) *Attorney, Agent, or Firm*—Fattibene & Fattibene; Paul A. Fattibene

(57) ABSTRACT

Coil is made to be disposed with gap opposed to the surface of wafer, and wafer stage is made to move in X and Y direction and R and θ direction. When supplying an alternating current to coil with the frequency swept by impedance analyzer, the magnetic field made to be induced in coil will operate on the conductive film of wafer. By changing a parameter (a frequency or an angle) influencing the skin effect of the conductive film and giving the parameter to coil, the state where a magnetic field is not made to penetrate relatively the film of wafer and the state where the magnetic field is made to penetrate relatively the film can be formed. From the variation of various values corresponding to the eddy current induced based on the change of state influenced by the skin effect of the conductive film, the film thickness of wafer can be measured with sufficient accuracy.

14 Claims, 21 Drawing Sheets

NUMBER OF TURNS: 23 ETC.

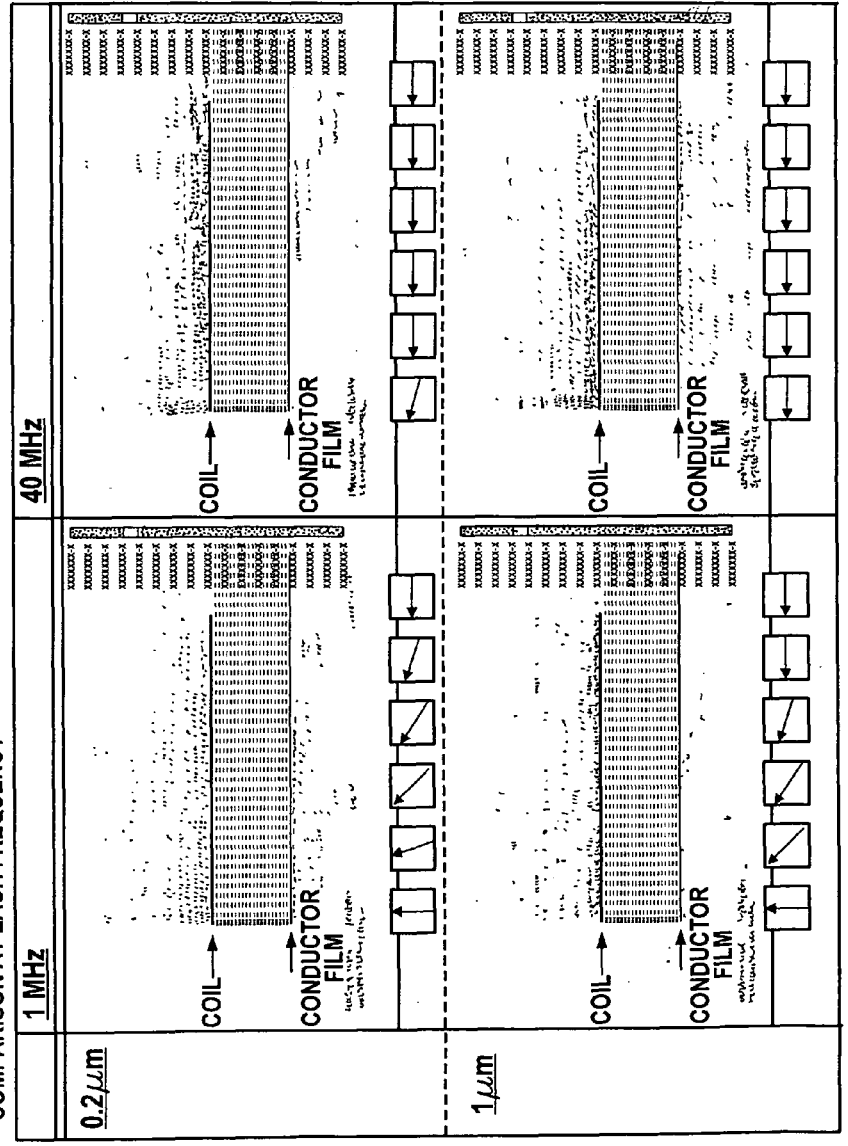

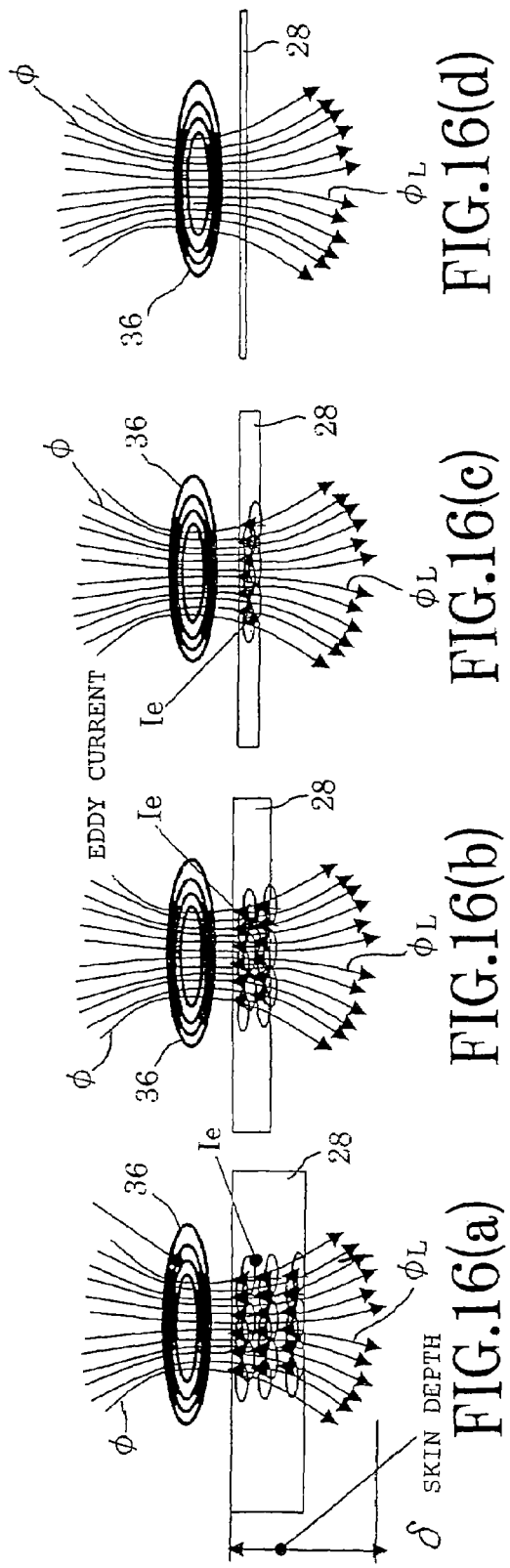
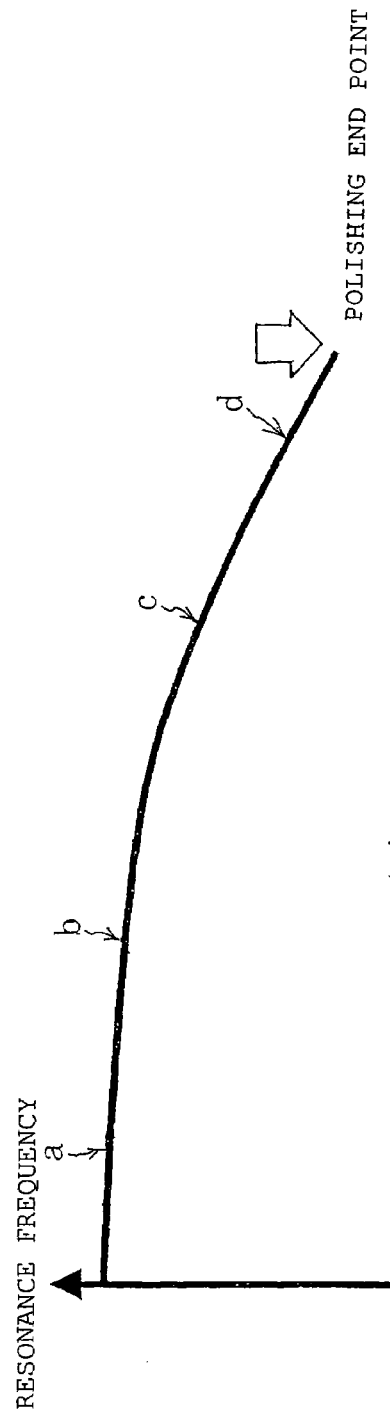

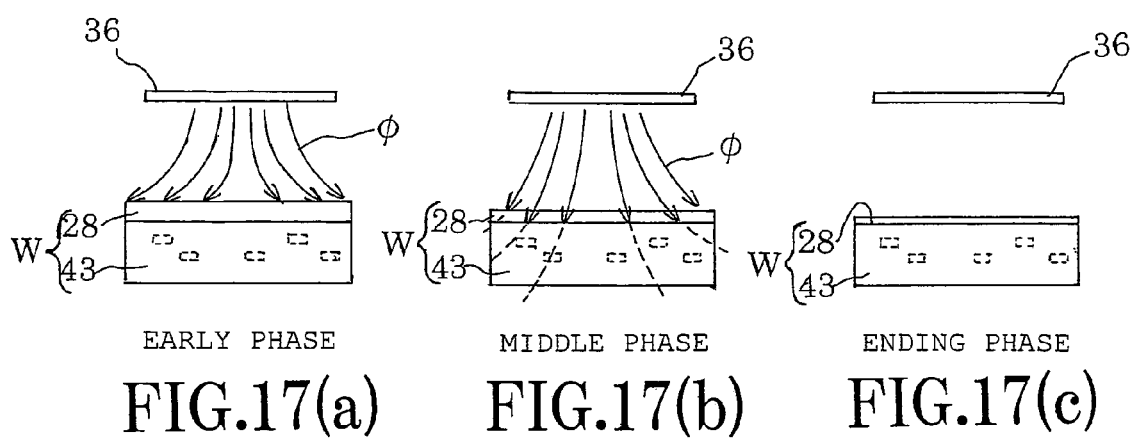
FIG.17(a) EARLY PHASE
FIG.17(b) MIDDLE PHASE
FIG.17(c) ENDING PHASE

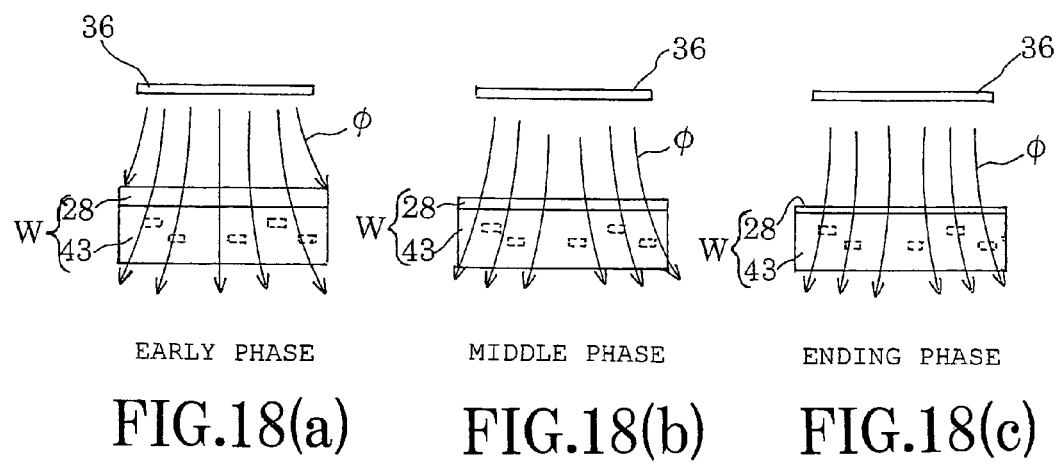
FIG.18(a) EARLY PHASE  FIG.18(b) MIDDLE PHASE  FIG.18(c) ENDING PHASE

FILM THICKNESS MEASURING APPARATUS AND FILM THICKNESS MEASURING METHOD

BACKGROUND OF THE INVENTION

1. Field of the Invention

The present invention relates to a film thickness measuring apparatus and a film thickness measuring method which measure a film thickness of a polishing completion time point, and in particular, the present invention relates to the film thickness measuring apparatus and the film thickness measuring method which measures the film thickness of the polishing completion time point accurately without extending a strong magnetic flux against an element etc. formed on a device wafer after restraining joule thermal loss caused by an eddy current to the local minimum in a chemical mechanical polishing (CMP), etc.

2. Description of Related Art

Known is the process for forming a wiring pattern, where an oxide film is formed on a surface of a semiconductor wafer, and lithography and etching to this oxide film is performed, and a groove pattern corresponding to a wiring pattern is formed, and a conductive film which comprise Cu, etc. filling up the groove pattern, etc. is film-formed thereon, and within this conductive film, unnecessary portions other than embedded parts, such as the groove pattern and a through hole portion is removed by a chemical mechanical polishing. In formation of this wiring pattern, it is extremely important to detect surely the polishing end point when the conductive film of the unnecessary portions is removed by proper thickness to stop the process. If polishing of the conductive film is excessive, the resistance of the wiring increases, and if polishing of the conductive film is too little, it leads to an insulating failure of the wiring.

As a conventional art relevant to this, for example, the following instant monitoring method of variation of the film thickness is known. This conventional art is a method for monitoring a thickness variation of the conductive film instantaneously in the method for removing the conductive film from the substrate body (semiconductor wafer) by the chemical mechanical polishing, where a sensor including a serial or a parallel resonant circuit with an inductor and a condenser comprising a coil winded on a ferrite pot type core in order to shape so that a directivity may be brought to the electromagnetic field, is disposed adjacent to the conductive film, and a swept output comprising the frequency of 20 Hz to 40.1 MHz from a source of an excitation signal is impressed to the sensor via an impedance means for operating point setting. Thereby, when the sensor is excited, an oscillation current will flow into the coil and an alternating electromagnetic field will be generated. Subsequently, this alternating electromagnetic field induces an eddy current in the conductive film. When the eddy current is induced in the conductive film, two effects will arise. First, the conductive film operates as loss resistance, and the effect is the resistance load against the sensor circuit, and this lowers the amplitude of the resonance signal, and lowers the resonance frequency. Second, when the thickness of the conductive film decreases, the effect as if the metal rod is drawn out from the coil of the inductor will arise therein, and this will cause a variation of the inductance and the frequency shift. Thus, the thickness variation of this conductive film is made to be detected continuously by monitoring the variation of the frequency shift relevant to the sensor resonance peak resulting from the thickness variation of the conductive film (for example, refer to Japanese Patent No. 2878178 (the 2 to 7th page, FIGS. 1 to 15)).

The following eddy current sensors are known as other conventional art, for example. This conventional art comprises: a sensor coil (eddy current sensor) disposed near a base substrate on which a conductive film is formed; an AC signal source forming the eddy current in the conductive film by supplying this sensor coil with an alternating current signal with constant frequency at about 8 to 32 MHz; and a detecting circuit for measuring a reactance component and resistance component including the conductive film, and the sensor coil further comprises: an oscillation coil connected to the signal source; a sensing coil disposed to the conductive film side of this coil; and a balance coil disposed to the opposite side at the side of the conductive film of the oscillation coil, wherein the sensing coil and the balance coil are connected in a reversed phase mutually. The conventional art outputs a synthetic impedance from the resistance component and the reactance component detected in the detecting circuit, and is made to detect the variation of the film thickness of the conductive film from the variation of the impedance in a wide range as almost linear relation (For example, refer to Japanese Patent No. 3587822 (the 3rd page, FIGS. 1 to 11)).

Further, the following eddy current sensor is known as other conventional art, for example. Like conventional art of Japanese Patent No. 3587822 (the 3rd page, FIGS. 1 to 11) shown previously, in [0008], a magnetic flux which a sensor coil forms penetrates a conductive film on the substrate disposed all over the sensor coil, an eddy current is made to be produced in this conductive film because magnetic flux changes in terms of alternating, and the eddy current loss arises because the eddy current flows into the conductive film, it is saying making a reactance component of impedance of a sensor coil reduce in terms of an equivalent circuit. The [0009] thereof described that in observing the variation of the oscillated frequency of the oscillator circuit, the conductive film becomes thin gradually with progress of the polishing, and thereby, the oscillated frequency decreases down to a self-oscillation frequency of the tank circuit where the conductive film becomes completely lost by polishing, and the oscillated frequency becomes nearly constant hereafter, and therefore, by detecting this point, an end point by means of chemical machinery polishing (CMP) of the conductive film is detectable. The [0025] thereof describes that, with progress of the polishing of the conductive film, the eddy current loss changes in connection therewith, and the equivalent resistance of the sensor coil changes, and therefore, since the oscillated frequency of the oscillator circuit changes, the signal corresponding to the volume of the frequency of the detection width is displayed on the monitor by dividing this oscillating signal by the frequency divider, or subtracting with a subtractor. Thereby, the transition of the frequency locus as shown in FIG. 2 of Japanese Patent Laid-Open No. 2003-21501 is obtained (for example, refer to Japanese Patent Laid-Open No. 2003-21501).

The conventional art described above has disclosed the content which monitors the decrement of the film thickness by the eddy current in the process of the polishing in which the film thickness decreases with time frame.

Next, the well-known example with respect to a film thickness measuring apparatus in a simple static state is described. For example, a film thickness measuring apparatus in a conventional conductive film disclosed in Japanese Patent Laid-Open No. 2002-148012, comprises: an eddy current coil sensor which detects a magnetic field due to the eddy current; and a displacement sensor for measuring a displacement between the eddy current coil sensor and the measuring object films, wherein film thickness measuring apparatus is constituted so as to measure the thickness of the measuring object film, based on the inductance change amount in the eddy current sensor and the displacement amount measured with the displacement sensor.

However, the eddy current coil sensor described here is the sensor which is made adjacent to a conductive film to introduce a magnetic flux, and makes an eddy current to be induced in the conductive film, and calculates for the film thickness by computing the amount of the eddy current from the change amount of the inductance of the inductance meter. In this technology, reference is made about the change amount of inductance. That is, the inductance change amount $\Delta L$ corresponds to the eddy current loss, and if a resistivity of the conductive film is known, the film thickness can be calculated corresponding to the amount of the eddy current loss (For example, refer to Japanese Patent Laid-Open No. 2002-148012).

The film thickness measuring apparatus of the conductive film disclosed by Japanese Patent Laid-Open No. 2005-227256 discloses a technology of the film thickness measuring apparatus, the technology comprises: disposing a measuring coil near a measuring object; impressing alternating voltage to the measuring coil section; generating an eddy current in the object; and measuring a variation of the impedance value of the measuring coil arisen under the effect of the eddy current as voltage to calculate the value of the measuring object.

According to this technology, the following operation effects can be presented by using a planate coil. First, by using photo lithography and forming with a thin film on the same substrate, relative position accuracy of a coil and a displacement sensor is improved by leaps and bounds, and a jig for adjusting a relative position and work for it becomes unnecessary.

Second, a spatial resolution of a film thickness gage can be improved by using the planate coil. For example, if the frequency is raised to 5 MHz, the sensitivity of the planate threefold winded coil can be increased by 10 or more times further. Although the time frame variation of the flux linkage in a thin film becomes large because the frequency increases, and the eddy current increases, the radial-distribution state is changed. That is, the eddy current will concentrate on the zone where the diameter is small. At this time, since the film thickness measured turns into the average film thickness of the zone in which the eddy current has arisen, that the zone in which the eddy current arises is small will be to measure the average film thickness of the narrow zone, and the spatial resolution will improve as a result.

In conventional art given in Japanese Patent No. 2878178 (the 2 to 7th page, FIG. 1 to 15), the sensor is provided with the serial or parallel resonant circuit with an inductor and a condenser comprising the coil winded on a ferrite pot type core for bringing the directivity to the electromagnetic field. A swept output having the frequency of 20 Hz to 40.1 MHz in the polishing early phase is impressed to the sensor, and by an alternating electromagnetic field with the directivity generated from the coil, a magnetic leakage flux penetrating the conductive film is made to be arisen, and a large eddy current corresponding to the film thickness of this conductive film is made to be induced from the polishing early phase. In order to induce a large eddy current corresponding to the film thickness of the conductive film, it is required to form a large magnetic flux so as to penetrate the conductive film, that is a large alternating electromagnetic field, and the monitor of the thickness variation of the conductive film is carried out from the polishing early phase to the polishing ending phase, using the eddy current induced in the conductive film. Accordingly, it is required during the monitor of the thickness change to make the magnetic flux penetrate toward the thickness direction of the conductive film. In a figure of Japanese Patent No. 2878178 (the 2nd to 7th page, FIGS. 1 to 15), this is also clear from the lines of magnetic flux penetrating this conductive film into the portion of all the conductive films being indicated.

It is common in the surface of the wafer in the polishing early phase that a pure Cu film (conductive film) is in the top layer. In order to make all these pure Cu films induce the eddy current, very large magnetic leakage flux is required. However, although the magnetic leakage flux induces the eddy current, which becomes Joule's heat to be consumed in the form of the eddy current loss after all. As for this joule thermal loss, for the pure Cu film on the top surface layer, the generation of heat is comparatively small, since the volume resistivity thereof is small. However, in the inner part wired thereon already, since a wiring cross section is small and the volume resistivity is small, a large eddy current is induced by penetrating magnetic flux, and as a result, large joule thermal loss will be induced locally. This problem sometimes develops into the melting and breaking of the wiring in a part. The so-called state of the induction heating will be caused, and a phenomenon in which the inside thereof is particularly filled with heat will be introduced. In particular, in Cu wiring, etc. it is concerned that heating of Cu will diffuse Cu in barrier films, such as Ta and in the case, a barrier film will be broken through and Cu will be diffused.

In the case of wiring is given to the surface part in many layers of the wafer, there are not only concerns about the surface Cu film, but also the concerns that a wiring part of the inner part of which processing has already completed is heated locally to make the effects diffuse around, and a dopant which forms a p-type and a n-type in the semiconductor substrate is diffused further to change also the characteristics of elements in the substrate. In the case of excessive eddy current flows into fine wiring, even when heat is not generated, an electromigration is caused and it may be made to result in an open circuit.

Further, for example, in the case of performing process by changing a polishing condition, at the time point when the amount of residual films reached at the predetermined value around the polishing end time point, it is difficult to discern whether the amount of residual films is the predetermined amount. It is because, although it is possible to guess based on the changed part from the early phase film thickness, if the early phase film thickness varies, the estimate of the predetermined amount of residual films will vary. With regard to the decision of the portion around the polishing end time point, if the gap between the sensor and the conductive film changes with the vibration of the polishing minutely, stray capacitance of the overall sensor circuitry changes and the overall resonance frequency shifts. Accordingly, even if the setting which discriminates the polishing end point is performed with setting up the threshold value corresponding to the resonance frequency set at a certain value, if the resonance frequency shifts on the whole, the decision of the polishing end time point based on the setting of the threshold value becomes difficult. Thus, in the resonance frequency which increases or decreases monotonously and continuously in a conventional art, even if the threshold value is set as a certain value, because a gap between a sensor and a conductive film changes minutely or a certain dielectrics intervene between them, it existed frequently that the waveform itself overall did parallel displacement up and down, and as a result, it existed frequently that the threshold value which was set up in advance did not make a meaning.

Also in conventional art given in Japanese Patent No. 3587822 (the 3rd page, FIGS. 1 to 11) using an eddy current sensor, it is almost the same as that of conventional art given in the above-mentioned Japanese Patent No. 2878178 (the 2nd to 7th page, FIGS. 1 to 15) that a monitor of thickness change of a conductive film, is performed based on variation of the eddy current from the polishing early phase to the polishing ending phase.

By the above-mentioned conventional art which monitors the film thickness of the conductive film from the polishing early phase to the polishing ending phase using the eddy current, it is necessary to make sufficiently strong magnetic flux to the extent of infiltrating into the film to cause the eddy current therein, and the shape of the inductor has became three-dimensioned, in order to give a directivity to the magnetic flux. Accordingly, when building a sensor into a polishing apparatus etc., there are generally the following problems. A current fed through a coil becomes large, power dissipation increases and power supply equipment also becomes large-sized. A magnetic flux leaks on the circumference and it is easy to generate a noise. A process step of coiling lead wire around a coiled form etc. is needed, and the cost becomes high.

In conventional art to comprise the eddy current sensor according to Japanese Patent Laid-Open No. 2003-21501, about hardware of the sensor portion used by this conventional art, first the sensor coil is configured on condition of penetrating the conductive film. Therefore, by hardware which generates only a magnetic field of the extent which does not penetrate the conductive film, the eddy current cannot be formed and the object cannot be attained. As the conductive film thickness decrease by the polishing, zones in which the eddy current is formed decrease monotonously, and a behavior in which an oscillated frequency decreases monotonously therefore is indicated there, and a time point when the oscillated frequency becomes nearly constant is intended to be deemed as the end point to be detected. In the algorithm of software used by this conventional art, as for a variation of the oscillated frequency, the variation where the frequency decrease down to a nearly constant level is considered as the variation of the oscillated frequency, and in the case of this oscillated frequency has changed as having an inflection point, for example, the algorithm cannot possibly detect the end point. There considered is the state which the magnetic flux penetrates the conductive film from the early phase of the polishing as shown in FIG. 2 of Japanese Patent Laid-Open No. 2003-21501, and the eddy current is always generating. Here, the eddy current sensor generates the eddy current positively from beginning to end, and the method of recomputing the thickness change from the eddy current variation is generally made to be the eddy current sensor.

An eddy current sensor given by Japanese Patent Laid-Open No. 2002-148012 is based on a technology having the premise of introducing the magnetic field into the conductive film theoretically. Here, the way how to take out the eddy current describes that a inductance change amount is computed and calculated using an inductance meter, and as phenomenalism, the principle has no change in being a general principle which makes magnetic field infiltrate an inner part of the conductive film, and detects the amount of eddy currents corresponding to the conductive film.

As a result, in the case of the film thickness of the conductive film formed over device elements is measured, the magnetic field will be given even to the internal device element at the same time the magnetic field is made to infiltrate the conductive film. At this time, in the case of the conductive film is thick, the energy of the magnetic field is absorbed as joule thermal loss caused by the eddy current formation in the conductive film. In the case of the conductive film is extremely thin, the given magnetic field is not interrupted by the surface of the conductive film, and infiltrates into the device element as it is. Consequently, an excessive eddy current is formed in the wiring section inside the device, problems of electromigration, etc. inside wiring, are induced as a result. In the case of measuring the film thickness by the variation of the amount of the eddy current, since the eddy current itself induced becomes weak gradually when the film thickness is extremely thin, measuring sensitivity will be reduced extremely as a result.

In a technology given by Japanese Patent Laid-Open No. 2005-227256, as a film thickness measurement principle, using change amount $\Delta L$ of an inductance component of planate coil 11 for measurement, and distance between planate coil 11 for measurement and conductive film 51, based on a data base of these correlation relationships calculated in advance, a film thickness of the part concerned on conducting film 51 is computed. Therefore, basically corresponding to the amount of the eddy current, the film thickness is determined.

Here, there not seen is the description that a variation of an eddy current has an inflection point, and the film thickness measurement is performed using the inflection point. Further, with regard to the conductive film, two aspects where the magnetic flux penetrates and does not penetrate based on the skin effect, are given, and utilizing the variation of the eddy current state in the two aspects, the film thickness is calculated is not described.

This technology has a forward direction coil and also an inversely winded reverse coil. A field which expands outside by the forward direction coil is made to be negated with this reverse coil. That is, since the magnetic flux to diverge is negated with the reverse coil and the magnetic flux concentrates on the middle position of the forward direction coil, the resolution can be improved. Here, even if a planate inductor is used, the planate inductor is made to have the role negating the magnetic flux which will not penetrate into the conductor film by selecting out only magnetic flux which penetrates the conductor film around the coil center section purely.

Such a method is not intending that the magnetic flux located on the circumference rather than the magnetic flux of the center section of the coil is used, in order to make magnetic flux not infiltrate the conductive film. The magnetic flux is made to penetrate positively at around the center section of the coil, and the penetrating magnetic flux is guided locally. It is premised on making the magnetic field infiltrate positively in the part in the conductive film.

From the above thing, the technology of Japanese Patent Laid-Open No. 2005-227256 uses the magnetic flux of the center section of the coil, makes the magnetic field infiltrate positively in the conductor film, removes the flux in the circumference of the coil, and makes the magnetic flux infiltrate in the conductor film only at the directory subjacent portion. The technology makes it important to make the magnetic field infiltrate the conductor basically, and is constituted for the purpose of eliminating the magnetic flux portion which does not infiltrate the conductor of the outer peripheral part of the coil. Japanese Patent Laid-Open No. 2005-227256 where the planate inductor is used makes it the base to remove the portion which the magnetic flux does not infiltrate, with making it a prerequisite to make the magnetic flux always penetrate.

However, as mentioned previously, even when the magnetic field is made to penetrate the conductor even locally, since a lot of magnetic fields become the eddy current to be consumed within the conductor, the heat is abruptly generated by the impressed magnetic field in a wiring part which exists particularly under the surface of the conductive film, and the disconnecting of wirings by electromigration, depending on the case, is also considered.

Here, using the planate inductor does not lead immediately to acquiring the skin effect as it is. Although it is also important to form a dispersed magnetic field using the planate inductor in order to acquire the skin effect, the skin effect is influenced by a frequency of an alternating magnetic field, and conductivity and permeability of the conductive film to be used, and is also dependent on the distance of the coil and the conductive film.

Therefore, by means of the skin effect, in the case of forming the state where magnetic flux penetrates relatively, and the state where magnetic flux does not penetrate relatively, setting up must be performed with factoring-in not only the shape of the inductor but the frequency to be used and the conductivity and permeability of the conductive film, etc.

It is important to form the state where the magnetic field penetrates the conductive film relatively, and the state where the magnetic field does not penetrate the conductive film relatively by rationalizing such setting. It becomes possible to calculate various values (film thickness, conductivity, permeability) of the conductive film based on the transition process of the polishing by utilizing the two changes of state. Although the skin effect expresses a phenomenon in which electromagnetic waves do not infiltrate even an inner part of the conductor, the skin effect as a phrase expression is used in the meaning corresponding the critical state of the state where the magnetic field penetrates the conductor film, and the state where the magnetic field does not penetrate the conductor film.

As a method to measure film thickness of a conductive film, besides such a well-known example, there exists also a method in which resistivity of the conductive film is measured by four probes, and from the resistivity thereof the film thickness is measured. However, since measuring is performed with direct contact to the conductive film, the conductive film surface may be damaged, and because of a state of the metallic film of the probe tip and a contact resistance of the probe tip and the wafer surface, etc., the measured film thickness value may deviate substantially.

Then, in order to improve the above conventional art, the following subject arises. That is, without extending a strong magnetic flux even on a microscopic wiring formed in the film, consequently by suppressing a generation of an eddy current induced by electromagnetic induction, the joule thermal loss caused by the eddy current needs to be restrained to the local minimum. Further, it is necessary to eliminate disconnecting wirings in the device element by the electromigration caused by the eddy current formation. The situation needs to be eliminated that setting of the threshold value changes substantially and detection become difficult to be performed, because the amount of the eddy current induced shifts on the whole by the variation of the gap between the sensor and the conductive film and dielectric matter such as slurry intervening therebetween.

Even if the magnetic field is a microscopic magnetic field of the extent which does not penetrate the device wafer, it is necessary to enable it to detect with accuracy sufficient enough. It is necessary to enable it to measure without contacting the film and without damaging the element surface. It is necessary to enable it to measure the desired amount of thin film with sufficient sensibility.

Therefore, the polishing end time point is estimated and detected with sufficient accuracy, and the amount of residual films to be removed and a polishing rate, etc. is estimated instantaneously with sufficient accuracy, and in order to evaluate accurately whether a predetermined conductive film is removed properly and has become desired film thickness, the technical problem which should be solved arises, and the object of the present invention is to solve this problem.

SUMMARY OF THE INVENTION

The present invention is proposed in order to attain the above-mentioned object, and the invention according to claim 1 provide a film thickness measuring method which, in a film thickness measuring method for measuring a film thickness of a conductive film formed on a substrate, opposes a coil to a surface of a conductive film, makes a magnetic field induced in the coil by an alternating current supplied to the coil operate on the conductive film, forms a state of the magnetic field being made not to penetrate the film relatively and a state of the magnetic field being made to penetrate the film relatively by giving the coil parameters changed to influence a skin effect of the conductive film, and measures a thin film constitution and various values of the film from variations of an eddy current induced based on a change of state influenced by the skin effect and various values corresponding to the eddy current induced.

According to such film thickness measuring method, by the skin effect, on some conditions, a state of the magnetic field not penetrating relatively the film of the conductive film is formed, and on some another conditions, a state of the magnetic field penetrating the conductive film is formed. Accordingly, the eddy current induced changes greatly. For example, making it to measure "film thickness" as one of various values of the film here, a "frequency" is made to be changed as a parameter which influences the skin effect. Changing the frequency, the magnetic field does not infiltrate in the conductive film according to the skin effect at a certain frequency. At this time, since the magnetic flux does not penetrate the conductive film, the eddy current is hardly generated. On the other hand, when the frequency is decreased, the magnetic flux will come to penetrate the conductive film from a certain frequency. As a result of the variation of the eddy current based on the variation of the state of the magnetic flux, by monitoring the critical frequency of the variation, it becomes possible to measure various values of the film (for example, film thickness) with sufficient accuracy. Although a formula of the skin effect is mentioned later, according to that, a depth to which the electromagnetic wave (including electric field and magnetic field) infiltrate the conductor film, what is called a skin depth (depth of penetration), changes depending on a dielectric constant and permeability of the conductor, and on the frequency given.

Although these values (skin depth) are values at the time of the electromagnetic wave being incident vertically into the conductor, in the case of the electromagnetic wave infiltrating the conductor with certain angle etc., since a depth which can be infiltrated also changes, the degree of penetration angle, etc. of the electromagnetic wave influence the depth to which the magnetic field infiltrates in the conductor film. From such a thing, in order to form the state of the electromagnetic wave becoming not penetrating by the skin effect and the state of penetrating thereby, various values, such as the frequency and the incident angle of the magnetic flux, influence.

As for the invention according to claim 2, the film thickness measuring method according to claim 1 is characterized in that the parameters which influences the skin effect are at least one of the frequency of the alternating voltage, the angle of the coil to be opposed, or the distance of the coil and the conductive film to be opposed.

According to such film thickness measuring method, for example, the frequency of the alternating voltage impressed to the coil is changed, and an inflection point of the frequency is searched, and the film thickness can be calculated from the inflection point. In particular, monitoring the variation of the eddy current under effect of the skin effect by forming an oscillator circuit and changing the frequency of the oscillator circuit, the method of measuring the film thickness can be provided. In addition, in the case of using the oscillator circuit, the amount of the eddy current is detectable as a mutual inductance of the coil by means of the variation of the resonance frequency.

As for the invention according to claim 3, the film thickness measuring method according to claim 1 is characterized in that the various values corresponding to the eddy current induced are at least one of the mutual inductance by means of the conductive film, the resonance frequency of the resonant circuit, an impedance of the conductive film, a reaction magnetic flux amount generated in the conductive film.

According to such film thickness measuring method, the magnetic field induced in the coil is made to operate on the conductive film, and the magnetic field is made to penetrate the film, and the eddy current is made to be generated in the conductive film. The film thickness can be measured based on the mutual inductance of the conductive film generated by the eddy current, the resonance frequency of the resonant circuit, impedance of a conductive film, and the reaction magnetic flux amount, etc. generated in the conductive film.

As for the invention according to claim 4, the film thickness measuring method according to any of claims 1, 2 or 3 is characterized in that the various values of the film are at least one of the film thickness of the conductive film, a conductivity distribution of the conductive film, or a permeability distribution of the conductive film, According to such film thickness measuring method, it is possible to measure the film thickness of the conductive film, the conductivity distribution of the conductive film, and the permeability distribution of the conductive film, etc. by making the eddy current generate in the conductive film, by forming the state of the magnetic flux generated by the coil being made not to penetrate into the conductive film and the state of the flux being made to penetrate therein.

As for the invention according to claim 5, a film thickness measuring apparatus for measuring a film thickness of a conductive film formed on a substrate, comprises: means for making a coil oppose to the surface of the conductive film; means for making a magnetic field made to be induced in the coil by applying an alternating voltage to the coil operate on the conductive film; means for sweeping a frequency given to the coil; means for forming a state of the magnetic field being made not to penetrate the film relatively and a state of the magnetic field being made to penetrate the film relatively; and means for measuring a thin film configuration and various values of the film from a change part of an eddy current of the conductive film based on a skin effect corresponding to a frequency change of the alternating voltage.

According to such film thickness measuring apparatus, by the skin effect, on some conditions, the state of the magnetic field not penetrating relatively into the film of the conductive film is formed, and on some conditions, the state of the magnetic field penetrating into the conductive film are formed.

Thereby, the eddy current induced changes greatly. For example, in the case of measuring the film thickness, by making the frequency change as a parameter which influences the skin effect, since the magnetic field does not infiltrate the conductive film at certain frequency because of the skin effect, the eddy current is scarcely generated. Since the magnetic flux comes to penetrate the conductive film from certain frequency as the frequency is decreased, the eddy current changes. As a result, various values of the film (for example, film thickness) can be measured with sufficient accuracy by monitoring a critical frequency where the eddy current changes.

As for the invention according to claim 6, a film thickness measuring apparatus for measuring a film thickness of a conductive film formed on a substrate, comprises: means for making a coil be opposed to a surface of the conductive film; means for making a magnetic field made to be induced in the coil by applying an alternating voltage to the coil operate on the conductive film; means for forming a state of making the magnetic field penetrate the film relatively, from a state of making the magnetic field not penetrate the film relatively, by changing a parameter influencing a skin effect and giving to the coil the parameter; and means for lightening and eliminating infiltration of the magnetic field into the film when detecting a change part of an eddy current by the magnetic field penetrating it to the film relatively, and measuring a film constitution and various values of the film based on the change part of the eddy current.

According to such film thickness measuring apparatus, a skin depth to which an electromagnetic wave infiltrates in a conductor film changes depending on a dielectric constant of the conductor, a permeability, and a frequency to be given. A value of the skin depth is a value at the time of the electromagnetic wave being incident vertically into the conductor. In the case of the electromagnetic wave infiltrating the conductor with certain angle etc., since the depth to which the electromagnetic wave can infiltrate also changes, the degree of penetration angle, etc. of the electromagnetic wave influences the depth to which the magnetic field infiltrates in the conductor film. Thus, for forming the state of the electromagnetic wave becoming not penetrating by the skin effect and the state of penetrating thereby, various values are influenced by the frequency and the incident angle of the magnetic flux, etc.

As for the invention according to claim 7, a film thickness measuring apparatus for measuring a film thickness of a conductive film formed on a substrate, comprises: means for making a coil be opposed to a surface of the conductive film, in the process of making a conductor film remove or deposit continuously on the substrate; means for making the magnetic field made to be induced in the coil by an alternating current operate on the conductive film; means for forming a state of making the magnetic field not penetrate the film relatively, and the state of making the magnetic field penetrate the film relatively, by changing a parameter influencing a skin effect of the conductive film and giving the parameter to the coil; and means for measuring a film constitution and various values of the film by measuring a remaining film thickness of the conductive film, a removed film thickness, and those change amount, and changing speed, from a change of an eddy current induced based on the change of state and variations of various values corresponding to the variation of the eddy current.

According to such film thickness measuring apparatus, the coil is driven by a high frequency, and a magnetic flux changing corresponding to a period of the high frequency is generated from the coil. Therefore, until a predetermined conductive film results in a film thickness corresponding to a skin depth by polishing, the magnetic flux induced by predetermined conductive film passes through a zone within the skin depth almost in parallel along the film surface. As polishing progresses, when the thickness of the predetermined conductive film is equivalent to or in the vicinity of the skin depth, a magnetic leakage flux penetrating the predetermined conductive film begins to arise. The amount of eddy currents induced by electromagnetic induction in the predetermined conductive film by variation of the magnetic flux changes. As for the eddy current, since the magnetic leakage flux penetrating the film increases, as the film thickness decreases, the eddy current induced gradually increases. A large mutual inductance is generated in this predetermined conductive film with the eddy current generated in this wide zone. This mutual inductance operates so that the self-inductance of the sensor circuitry in the high frequency inductor type sensor may be decreased. Thus, in an early phase, even if the film thickness of the conductive film decreases, in the case of the magnetic flux infiltrating the conductive film is the extent which does not penetrate the wafer, a certain eddy current is formed. Then, in the case of the film thickness decreases further and turns into within the film thickness corresponding to the skin depth, the magnetic flux a part of which penetrates the conductive film on the wafer is leaked out even to the rear face of the wafer is generated. At this time, the eddy current induced in the film with the increase of the magnetic leakage flux becomes large. Next, although the eddy current formed in the wafer surface increases to a certain film thickness, then, since the conductive film itself generating the eddy current decreases, the eddy current decreases as the conductive film is furthermore removed. As a result, in spite of being a monotonous film thickness decreasing process, the eddy current increases with the penetration magnetic flux buildup once, and following further decreasing of the film thickness after that, because of decreasing quickly in connection with the volume itself generating the eddy current decreasing, a maximum point appears in the mutual inductance corresponding to the eddy current induced. The mutual inductance also decreases quickly by rapid decreasing of this eddy current, and the inductance of the sensor circuitry turns to an increase. Thus, after predetermined conductive film is equivalent to or in the vicinity of the skin depth, the eddy current is generated with progress of polishing, and by subsequent rapid decreasing thereof, the inductance of the sensor circuitry once decreases and changes to an increase after that. By this behavior, a peak (inflection point) is generated in the waveform of the resonance frequency oscillated from the high frequency inductor type sensor. A reference point just before a polishing completion point is detected based on this peak, and the polishing completion time point is estimated from this reference point. In other words, the film thickness of the conductive film can be measured.

Since this peak appears in the film thickness corresponding to the skin depth, there is no problem of changing setting of a threshold value by means of overall shifting of the amount of eddy currents induced as described previously, and the peak always appears in a position corresponding to the remaining film thickness. Particularly, in the case of the conductive film is Cu, for example, the peak appears at around 710 Å in the remaining film of Cu. In the case of W film, the peak appears at the portion 2500 Å which is a little thicker. Although this film thickness differs from the actual skin depth, it is a numeric value corresponding to the skin depth. Although skin depth $\partial$ is an index showing for convenience a depth where intensity of electromagnetic waves becomes the volume of 1/e, this peak position is also brought about by the skin effect since the position is determined with a conductivity and permeability of material and a frequency to be impressed, etc. The present invention is the technology attained by using skillfully the unique phenomenon appearing according the skin effect of the material. Since wiring material has high conductivity in CMP of the wiring material particularly, the peak position appears as a comparatively sharp peak (maximum point) at around end point (710 Å) Therefore, robust end point detection and end point estimation is possible without swinging also against various disturbances.

The invention according to claim 8 comprises the film thickness measuring apparatus where, in the invention according to claim 7, a sample of an actually measured conductive film or a corresponding sample is used in advance, and changing a parameter influencing the skin effect of the conductive film and giving the parameter to the coil, the state of making the magnetic field not penetrate the film relatively and the state of making the magnetic field penetrate the film relatively are formed, and the induced eddy current influenced by the skin effect or various values corresponding to the eddy current induced are contrasted with a variation of a reference waveform of a sample obtained by measuring in advance, and the film constitution and various values of the film in the real sample are measured and discriminated.

As for such film thickness measuring apparatus, it is not that the eddy current is intentionally produced positively in the film, and that the film thickness is monitored. Although a sensor coil is formed so that directivity may be given to this magnetic field in order to provide a magnetic field penetrating the conductive film in the conventional publicly known sensor, a planate inductor is used in the film thickness measuring apparatus according to the present invention. Thereby, the directivity is not given to the magnetic field, and the magnetic field can be made to diverge moderately against the conductive film so as not to infiltrate the conductive film deeply. This is because an internal wiring is locally overheated by the eddy current, and the wiring itself will be disconnected by electromigration etc. in the case of the magnetic field infiltrates deeply, or in the case of the strong magnetic field is given in order to make the magnetic field infiltrate deeply. Consequently, the planate inductor is made to have a configuration making the magnetic field not infiltrate the conductive film as much as possible, and in other words, forming a moderate magnetic flux distribution to the extent of not generating the eddy current which gives a damage to the elements. When the conductive film becomes thin just before the conductive film is removed, even if the magnetic field diverging moderately is given, such magnetic flux a part of which penetrates the conductive film appears. This rapid variation appearing when the thickness changes into a thin conductive film state around the end point is monitored. Therefore, the algorithm detecting the frequency, the inductor, and its signal is made to have the configuration maximizing the inflection point around the end point.

As for the invention according to claim 9, a film thickness measuring apparatus for measuring a film thickness of a conductive film formed on a substrate, comprises: holding means holding a conductive substrate having a conductive film; a coil made to be opposed to the conductive substrate with certain distance separated; a condenser connected to the coil in parallel; a transmitter for giving a signal to a resonant circuit formed by the coil and the condenser; frequency counting means for calculating for a resonance frequency of the resonant circuit; parameter changing means for giving the coil an alternating current of high frequency, making a magnetic field made to be induced in the coil operate on the conductive film, and changing a parameter influencing a skin effect of the conductive film; and measuring means for forming a state of making the magnetic field not penetrate the film relatively, and a state of making the magnetic field penetrate the film relatively, and measuring a variation of an eddy current induced by a change of state based on the skin effect or variations of various values corresponding to the eddy current induced, wherein the film thickness constitution and various values of the film formed on the substrate are measured.

According to such film thickness measuring apparatus, since the state of the magnetic field not penetrating into the film of the conductive film and the state of penetrating therein can be formed according to the skin effect, the eddy current induced changes greatly. Therefore, in the case of measuring the film thickness, by changing the frequency as the parameter influencing the skin effect, at a certain frequency, because of the magnetic field not infiltrating the conductive film according to the skin effect, the eddy current is scarcely generated. Since the magnetic flux comes to penetrate the conductive film from a certain frequency when the frequency is made to go to decreasing, the eddy currents change. As a result, various values of the film (for example, film thickness) can be measured with sufficient accuracy by monitoring the critical frequency where the eddy current changes.

The invention according to claim 10 comprises the film thickness measuring apparatus where, in the invention according to claim 9, parameter changing means changes at least one of the frequency of the alternating current of high frequency, the distance between the coil and the conductive film, or the angle of the coil against the surface of the conductive film.

According to such film thickness measuring apparatus, for example, the frequency is made to be changed and from the inflection point, the film thickness can be calculated. Concretely, an oscillator circuit is formed, and by forming the oscillator circuit to change the frequency of the oscillator circuit, the film thickness measuring apparatus monitoring the variation of the eddy current by the effect of the skin effect to measure the film thickness can be provided. In addition, in the case of the oscillator circuit is used, the amount of the eddy currents is detectable as the mutual inductance of the coil with the variation of the resonance frequency.

The invention according to claim 11 comprises the film thickness measuring apparatus where, in the invention according to claims 5, 6, 7, 8, 9, or 10, the various values of the film are at least one of the film thickness of the conductive film, the conductivity distribution or the permeability distribution.

According to such film thickness measuring apparatus, the film thickness of the conductive film, the conductivity distribution of the conductive film, the permeability distribution of the conductive film, etc. can be measured by forming the state of the magnetic flux generated in the coil being made not to penetrate into the conductive film and the state of the flux being made to penetrate therein and making the conductive film generate the eddy current.

The invention according to claim 12 comprises the film thickness measuring apparatus where, in the invention according to claims 5, 6, 7, 8, 9, 10, or 11, the coil is formed by a two-dimensional planate inductor.

According to such film thickness measuring apparatus, the planate coil is used for the coil opposed to the conductive film. Thereby, the directivity is not given to the magnetic field against the conductive film, and the magnetic field can be made to diverge moderately so that the magnetic field does not infiltrate the conductive film deeply. This is because the internal wiring is locally overheated by the eddy current, and the wiring itself will be disconnected by electromigration etc. in the case of the magnetic field infiltrates deeply, or in the case of the strong magnetic field is given in order to make the magnetic field infiltrate deeply. Consequently, the planate inductor is made to have the configuration making the magnetic field not infiltrate the conductive film as much as possible, and in other words, forming the moderate magnetic flux distribution to the extent of not generating the eddy current which gives a damage to the elements. When the conductive film becomes thin just before the conductive film is removed, even if the magnetic field diverging moderately is given, such magnetic flux a part of which penetrates the conductive film appears. This rapid variation appearing when the thickness changes into a thin conductive film state around the end point is monitored. Therefore, the algorithm detecting the frequency, the inductance, and its signal is made to have the configuration maximizing the inflection point around the end point.

In the invention according to claim 1, since the state of the magnetic field penetrating into the film of the conductive film and not penetrating therein can be formed by changing the frequency, the eddy current induced by the conductive film changes greatly. By the variation of the eddy current based on the variation of such magnetic flux state, the film thickness can be measured with sufficient accuracy by monitoring the critical frequency of the variation, for example. At this time, since the inflection point of the critical frequency has a sharp peak value, the inflection point does not swing according to various disturbances etc. Accordingly, the film thickness measured based on the inflection point becomes what has extremely good accuracy.

In the invention according to claim 2, if the inflection point of the frequency is calculated by changing the frequency of the oscillator circuit impressed to the coil, the film thickness of the conductive film can be calculated automatically. Therefore, it becomes possible to calculate for the film thickness with high precision by the configuration of the simple detecting circuit.

In the invention according to claim 3, when the magnetic field made to be induced in the coil is made to operate on the conductive film to generate the eddy current, the film thickness can be measured by measuring the mutual inductance of the conductive film arisen according to the eddy current, the resonance frequency of the resonant circuit, the impedance of the conductive film, or the reaction magnetic flux amount generated in the conductive film. Therefore, the film thickness of the conductive film can be measured by the simple measuring circuit.

In the invention according to claim 4, by forming the state of the magnetic flux induced by the coil being made not to penetrate into the conductive film and the state of the flux being made to penetrate therein to generate the eddy current in the conductive film, not only the film thickness of the conductive film can be measured, but also there can be measured the conductivity distribution of the conductive film and the permeability distribution of the conductive film, etc. Therefore, since the polishing conditions of the conductive film at the time of polishing can be evaluated from many directions, the production yield of the semiconductor wafer can be improved.

In the invention according to claim 5, for example, in the case of measuring the film thickness of semiconductor wafers, since the magnetic field does not infiltrate in the conductive film at a certain frequency according to the skin effect with changing the frequency as the parameter influencing the skin effect, the eddy current is scarcely generated. Since the magnetic flux will come to penetrate the conductive film from a certain frequency when the frequency is decreased, the eddy current changes. As a result, the film thickness can be measured with sufficient accuracy by monitoring the critical frequency where the eddy current changes.

In the invention according to claim 6, by changing not only the frequency, but also the incident angle of the magnetic flux doing incidence into the film of the conductive film, the state of the electromagnetic wave becoming not to penetrate the film by the skin effect and the state of penetrating thereby can be formed. Therefore, the film thickness of the conductive film can be measured with sufficient accuracy with many-sided measuring methods.

In the invention according to claim 7, the coil is made adjacent to the conductive film, and the change flux in the conductive film induced by the magnetic flux formed with the coil is monitored, and the polishing completion time point can be estimated based on the flux change according to the skin effect in which the film thickness under polishing is determined by making the material of the conductive film as one factor. At this time, since a sharp peak is generated at the inflection point of the measuring frequency, the peak always appears at the position corresponding to the remaining film thickness without swinging against various disturbances. Accordingly, from the reference point detected based on the inflection point, the polishing completion time point can be estimated and detected with sufficient accuracy.

In the invention according to claim 8, by using the planate type coil (inductor), the magnetic field is made not to infiltrate the conductive film as much as possible. In other words, the moderate magnetic flux distribution to the extent of not generating the eddy current giving damage to the element can be formed.

In the invention according to claim 9, since the state of the magnetic field not penetrating the film of the conductive film and the state of penetrating therein can be formed according to the skin effect, the eddy current induced changes greatly. Therefore, by changing the frequency as the parameter influencing the skin effect, the critical frequency where the eddy current changes can be monitored, and the film thickness can be measured with sufficient accuracy.

In the invention according to claim 10, by changing the frequency of the oscillator circuit and impressing to the coil, the variation of the eddy current under the effect of the skin effect can be monitored, and the film thickness can be measured. At this time, since the variation of the resonance frequency can detect the amount of the eddy currents as the mutual inductance of the coil in the case of the oscillator circuit is used, it becomes possible to realize detection means extremely easily.

In the invention according to claim 11, by forming the state of making the magnetic flux generated by the coil being made not to penetrate into the conductive film and the state of making the flux being made to penetrate therein to generate the eddy current in the conductive film, since the film thickness of the conductive film, the conductivity distribution of the conductive film, the permeability distribution of the conductive film, etc. can be measured, the thin film constitution of the semiconductor wafer can be observed from many directions.

In the invention according to claim 12, since the coil made to generate magnetic flux is formed by the two-dimensional planate inductor, the magnetic field can be made not to infiltrate the conductive film as much as possible. That is, the moderate magnetic flux distribution to the extent of not generating the eddy current giving damages to the semiconductor device can be formed to measure the film thickness.

BRIEF DESCRIPTION OF THE DRAWINGS

FIG. 11 shows the result of an electromagnetism simulation of to what kind of direction the magnetic field generated from the coil being disposed on a conductor film in the embodiment according to the present invention, 11A shows the case that the oscillated frequency from the sensor is 1 MHz and the film thickness of the conductor film is 0.2 μm, 11B shows the case that the oscillated frequency from the sensor is 1 MHz and the film thickness of the conductor film 1 μm, 11C shows the case that the oscillated frequency from the sensor is 40 MHz and the film thickness of the conductor film 0.2 μm, and 11D shows the case that the oscillated frequency from the sensor is 40 MHz and the film thickness of the conductor film 1 μm;

FIG. 16 shows a combination figure as a comparative example of FIGS. 15, and 16A to 16D show examples of the variation of the magnetic flux and eddy current accompanying the removal by polishing of the conductive film, and 16E is a characteristics figure showing a example of the variation of the resonance frequency against the thickness change of the conductive film;

FIG. 17 shows a variation of magnetic flux corresponding to energy consumption of the magnetic field in the embodiment according to the present invention, and 17A shows a polishing early phase, 17B shows a polishing middle phase, and 17C shows a polishing ending phase, respectively;

FIG. 18 shows a comparative example of FIGS. 17, and 18A shows a polishing early phase, 18B shows a polishing middle phase, and 18C shows a polishing ending phase, respectively;

DETAILED DESCRIPTION OF THE PREFERRED EMBODIMENTS

The present invention has been realized by providing the film thickness measuring method and the apparatus characterized in that, in the film thickness measuring method measuring the film thickness of the conductive film formed on the substrate, in order to attain the object of the polishing end time point of the wafer being estimated and detected accurately, and of the amount of the residual film to be removed as well as the polishing rate, etc. being computed accurately in real time, and of the desired film thickness being made to be formed with a predetermined conductive film removed properly, by means of opposing the coil to the surface of the conductive film, making the magnetic field made to be induced by the coil with the alternating current supplied to the coil operate on the conductive film, and making parameters which influence the skin effect of the conductive film change and giving the parameters to the coil, the state of the magnetic field being made not to penetrate relatively into the film and the state of the magnetic field being made to penetrate relatively into the film are formed, and from the eddy current induced based on the change of state influenced by the skin effect and the variations of various values corresponding to the eddy current induced, the thin film constitution and the various values of the film are measured.

Hereafter, a preferred embodiment according to the present invention is described in detail with reference to FIGS. 1 and 2.

First, the film thickness measuring apparatus according to the present invention is described using figures on the principle. FIG. 1 shows a conceptual diagram of a configuration of the film thickness measuring apparatus according to the present invention. As shown in FIG. 1, wafer 102 is mounted on the surface of wafer stage 101 movable to X and Y direction or in R and θ. Sensor 104 provided with coil 103 in the position opposed to wafer 102 across space is disposed. That is, wafer 102 and coil 103 are disposed across space with each opposed. Further, impedance analyzer (or network analyzer) 105 is connected with sensor 104, and a film thickness detection signal is outputted to the outside from sensor 104.

Figure 1:
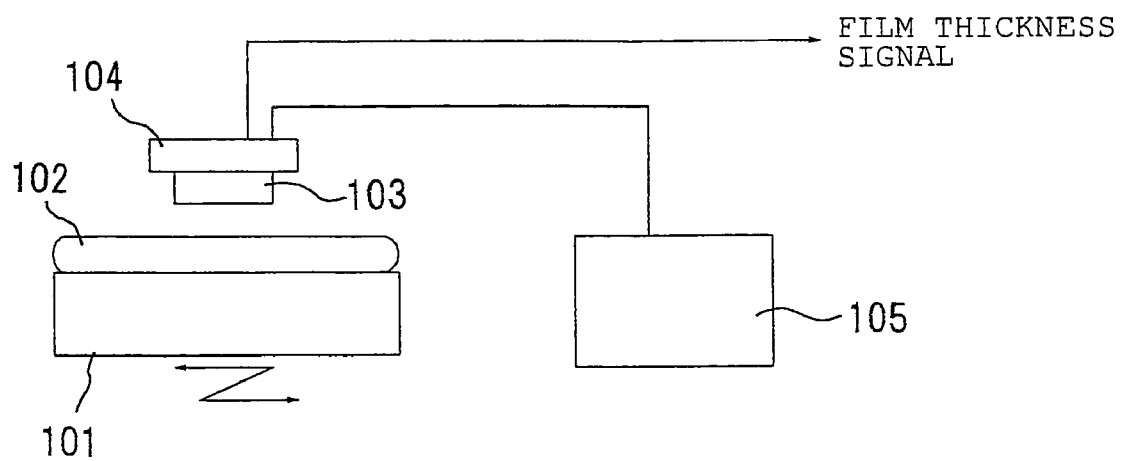
FIG. 1 shows a conceptual diagram showing a configuration of a film thickness measuring apparatus according to the present invention.
Figure 2:
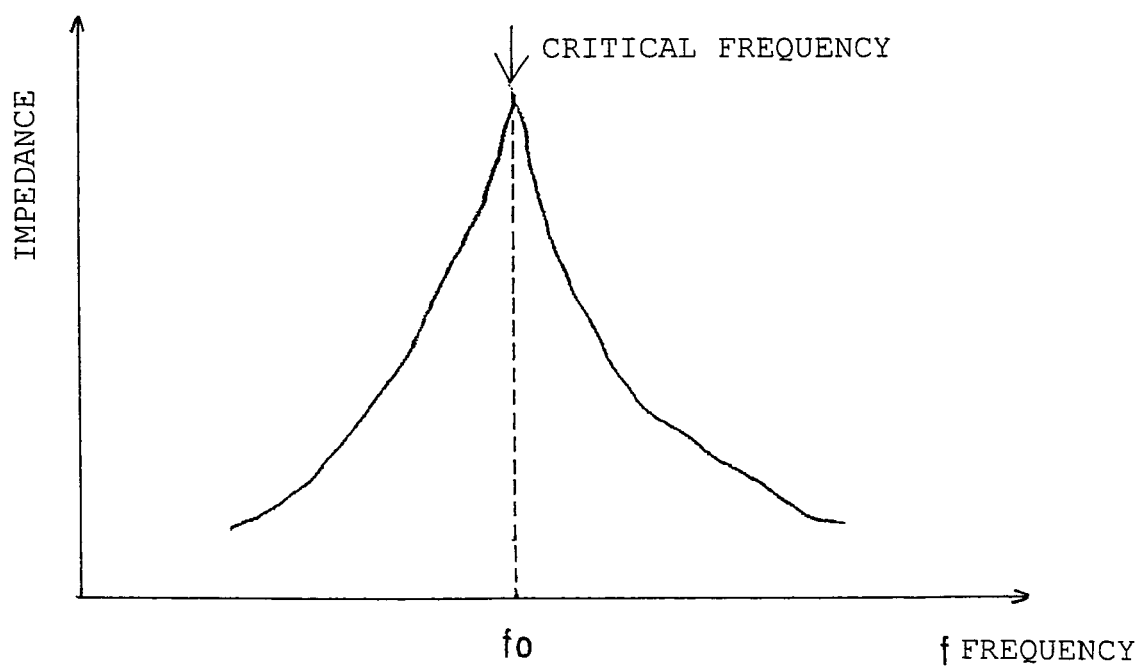
FIG. 2 shows a characteristics figure showing variation of an impedance when sweeping frequency with impedance analyzer (or network analyzer) 105 in the film thickness measuring apparatus shown in FIG. 1.

FIG. 2 is a characteristics figure showing a variation of impedance when sweeping a frequency with impedance analyzer (or network analyzer) 105 in the film thickness measuring apparatus shown in FIG. 1. The frequency swept is shown on a horizontal axis and the impedance of the conductive film of wafer 102 is shown on the vertical axis.

That is, in the state where the magnetic flux generated with coil 103 infiltrates the conductive film of wafer 102, the eddy current generated in the conductive film of wafer 102 corresponding to the volume of the infiltrating magnetic flux increases. The Joule's heat consumed by the eddy current also increases as the frequency of magnetic flux rises. Further, when the frequency is made to increase with impedance analyzer (or network analyzer) 105, the magnetic flux will become difficult to infiltrate into the inner part of the conductive film of wafer 102 because of the skin effect of the conductive film of wafer 102 as the frequency rises. In connection with that, the eddy current formed in the conductive film also decreases rapidly. At this time, the alternating magnetic field given to the conductive film of wafer 102 is mainly consumed in the surface impedance lost with the propagating in the surface of the conductive film of wafer 102. However, the energy is extremely small compared with the energy consumed by the eddy current.

Therefore, since the mode is switched over with a certain frequency as an inflection point (that is, a critical frequency) and the amount of eddy current changes greatly as the frequency of the alternating voltage impressed to coil 103 is made to be raised, the inflection point appears in impedance as shown in FIG. 2. Using the inflection point of the impedance, the film thickness of the wafer 102 can be calculated from the relation between the various values of the film (film thickness, for example) of the conductive film of the wafer 102 and parameters (a frequency, for example) which influences the skin effect.

That is, the frequency is swept with impedance analyzer (or network analyzer) 105, and when reaching at the inflection point (or rate of change) of impedance consumed with coil 103, the frequency (that is, the critical frequency) is monitored. At this time, as a sweeping direction of the frequency, it is better to make it sweep from the high frequency zone to the low frequency zone in order to prevent the magnetic flux from coil 103 from infiltrating wafer 102. Thus, the film thickness of wafer 102 can be measured by the inflection point (that is, the critical frequency) of the change of the impedance or the change of the resonance frequency. That is, by moving wafer 102 to X and Y direction or in R and θ against sensor 104, the film thickness in the whole surface of wafer 102 is measured, and the film thickness signal can be sent out to an external measuring apparatus (not shown) from sensor 104.

Figure 3:
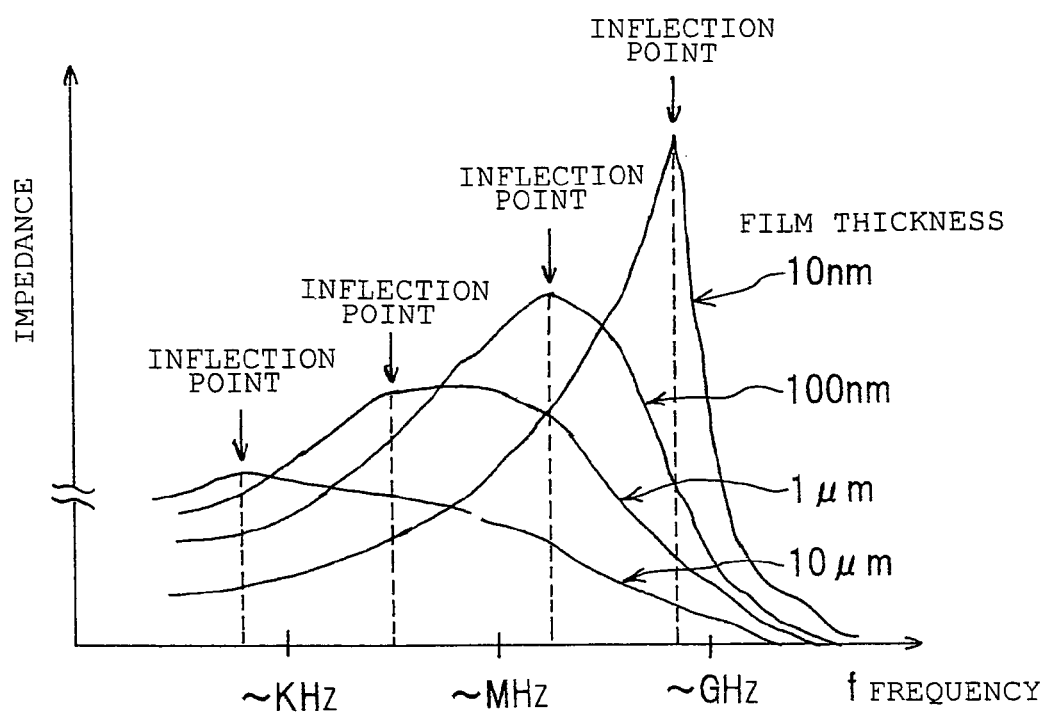
FIG. 3 shows a characteristics figure showing variation of a inflection point of the frequency when making film thickness of a conductive film of wafer 102 as a parameter in the film thickness measuring apparatus shown in FIG. 1.

FIG. 3 is a characteristics figure showing variations of the inflection point of the frequency when making the film thickness of the conductive film of wafer 102 as a parameter in the film thickness measuring apparatus shown in FIG. 1. The frequency swept is shown on the horizontal axis and the impedance of the conductive film of wafer 102 is shown on the vertical axis. That is, as shown in FIG. 3, a peak of the inflection point of the frequency appears notably so that the film thickness of the conductive film is thin (the film thickness is 10 nm, for example). This is because the change of state influenced by the skin effect appears notably so that film thickness is thin.

Figure 4:
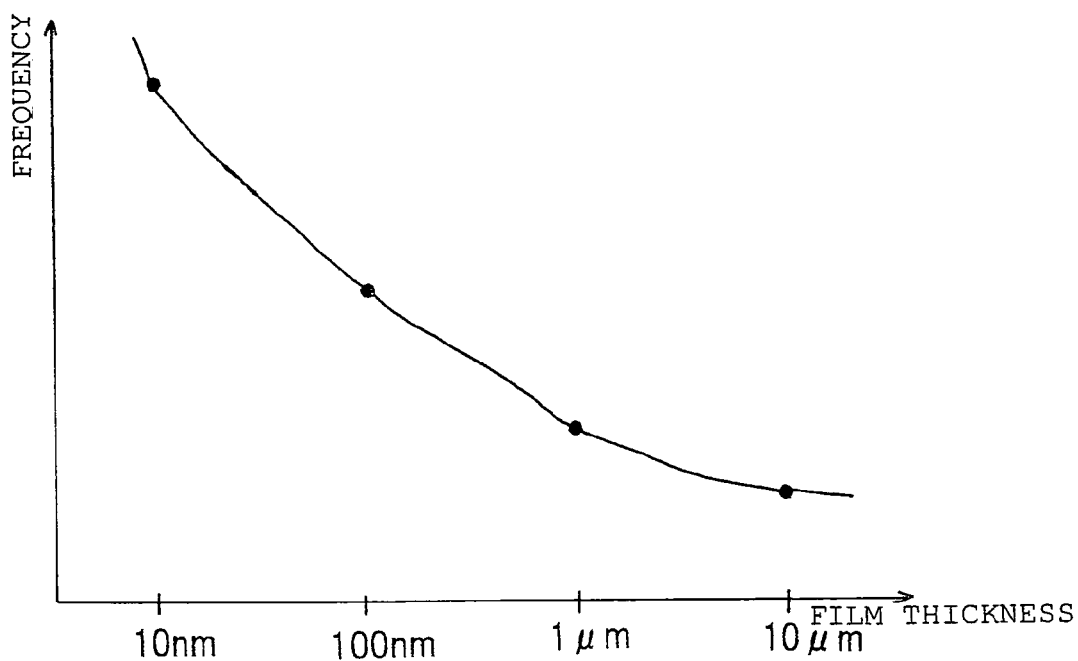
FIG. 4 shows a characteristics figure showing a relation between the film thickness and the frequency of the inflection point in the film thickness measuring apparatus shown in FIG. 1.

FIG. 4 is a characteristics figure showing a relation between the film thickness and the frequency (critical frequency) of the inflection point in the film thickness measuring apparatus shown in FIG. 1. The film thickness is shown on the horizontal axis and the frequency (critical frequency) of the inflection point is shown on the vertical axis. As shown in FIG. 4, when the film thickness is thick to about 10 μm, since the frequency of the inflection point is low and does not appear notably, the detecting accuracy of the film thickness worsens. On the other hand, when film thickness is thin to about 10 nm, since the frequency of the inflection point is high and appears notably, the detecting accuracy of the film thickness becomes good. As mentioned above, the film thickness of the conductive film of wafer 102 can be calculated with high precision by calculating the critical frequency as the inflection point of the impedance change by changing the parameter (frequency, for example) given to coil 103 which influences the skin effect.

Figure 5:
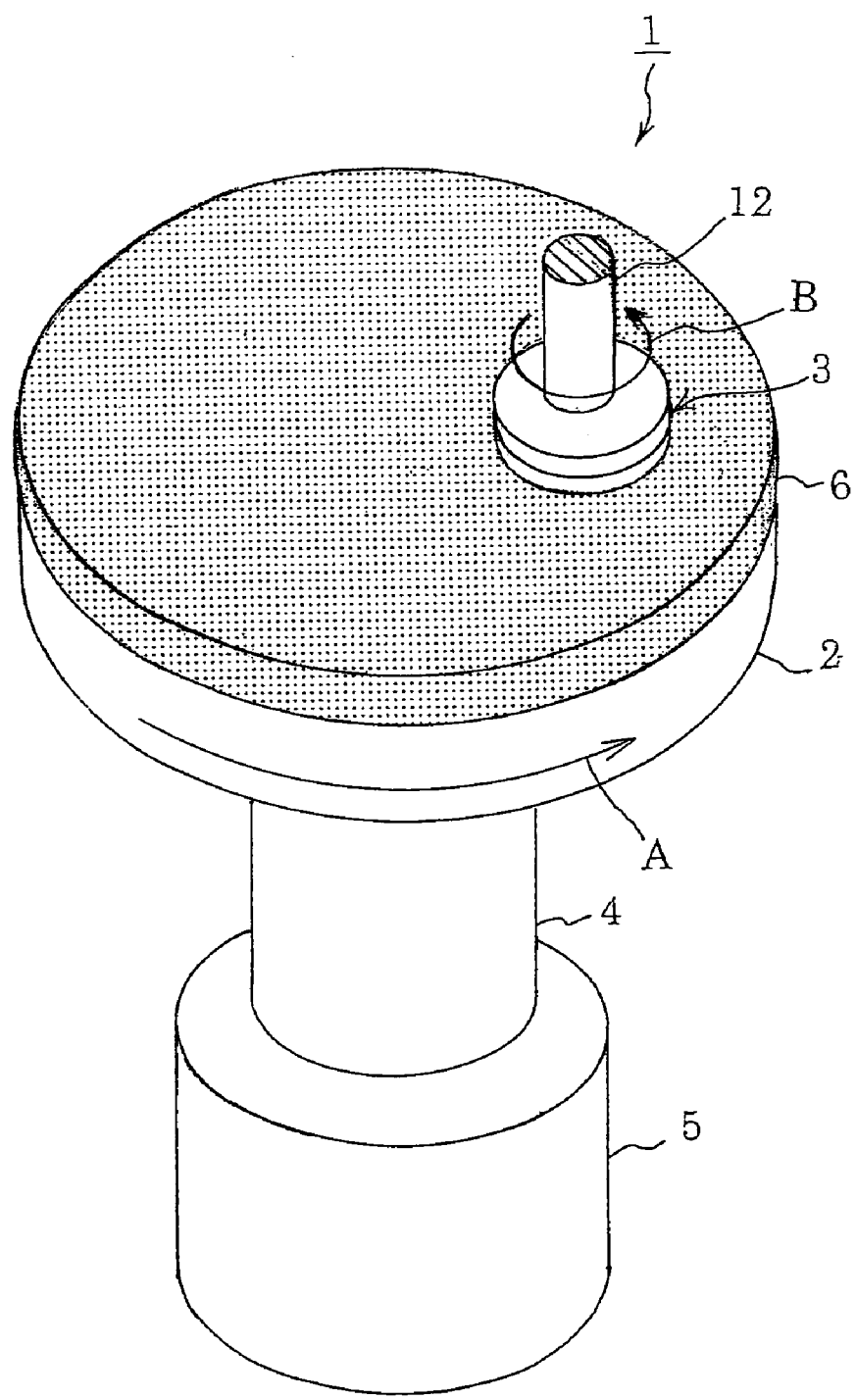
FIG. 5 shows a perspective view of chemical mechanical polishing apparatus in which a estimating device of a polishing completion time point in accordance with the embodiment of the present invention is incorporated.
Figure 6:
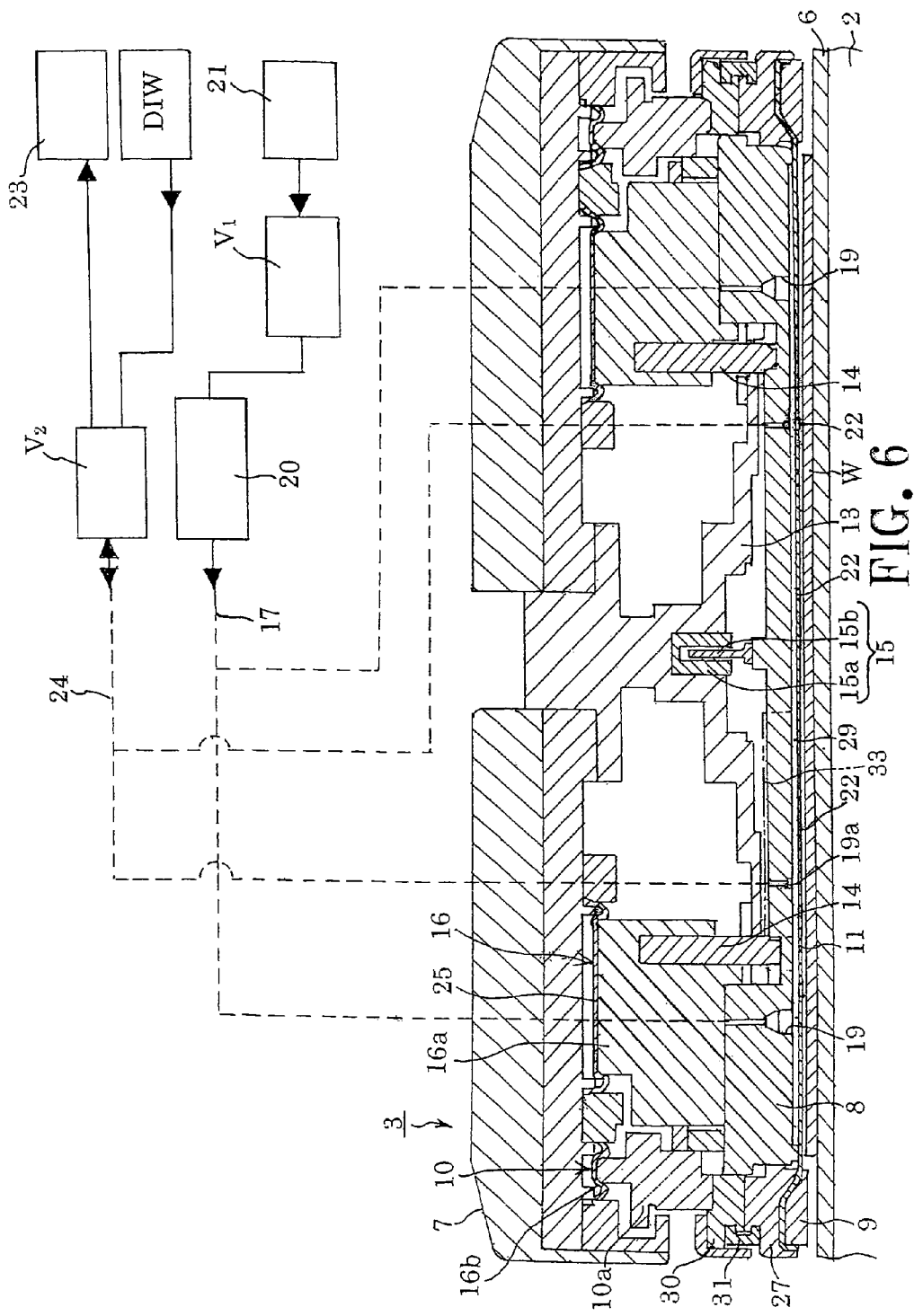
FIG. 6 shows an enlarged longitudinal sectional view of a polishing head in the chemical mechanical polishing apparatus of FIG. 5.
Figure 7:
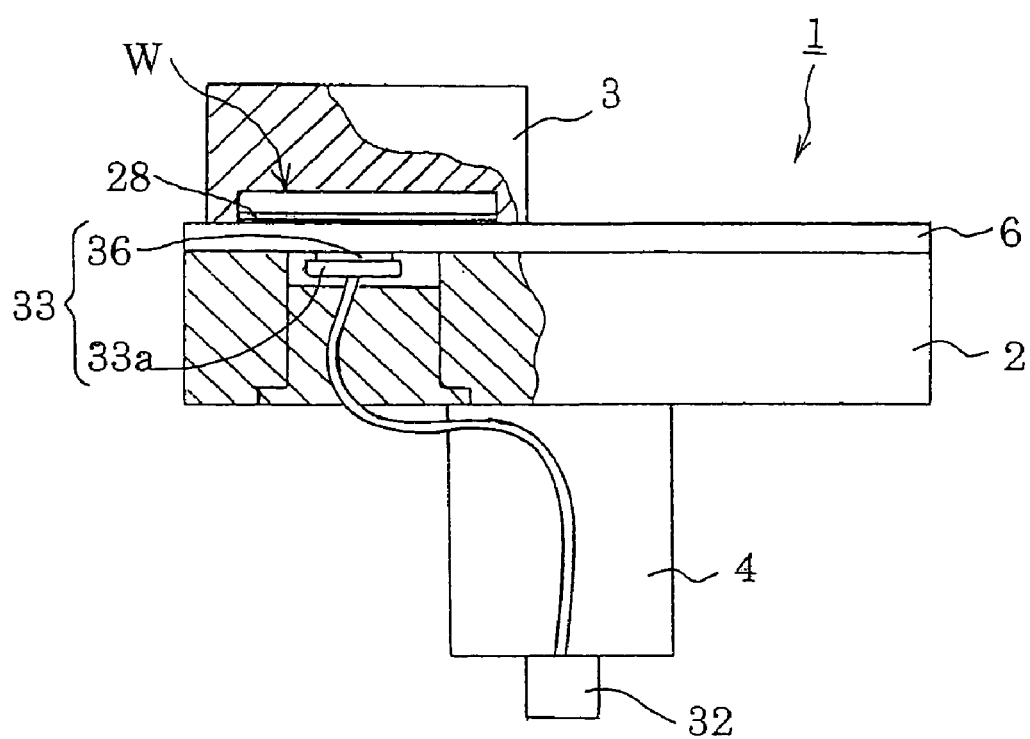
FIG. 7 shows a schematic side view having partial fracture for describing a state where incorporated is the estimating device of the polishing completion time point in accordance with the embodiment of the present invention in platen.
Figure 8:
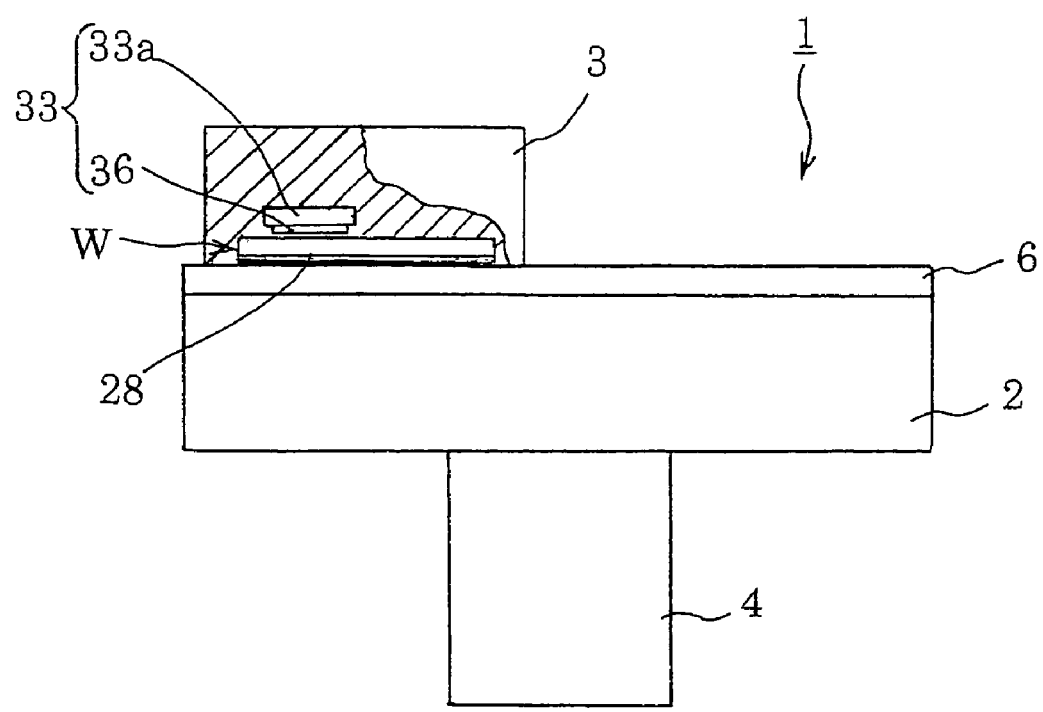
FIG. 8 shows a schematic side view having partial fracture for describing a state where incorporated is the estimating device of the polishing completion time point in accordance with the embodiment of the present invention in the polishing head.

FIG. 5 shows a perspective view of the chemical mechanical polishing apparatus in which an estimating device of the polishing completion time point is incorporated, FIG. 6 shows an enlarged longitudinal sectional view of a polishing head, FIG. 7 shows a schematic side view with a partial fracture for describing the state where the estimating device of the polishing completion time point is incorporated in the platen, and FIG. 8 shows a schematic side view with a partial fracture for describing the state where the estimating device of the polishing completion time point is incorporated in the polishing head.

With respect to an estimating method for the polishing completion time point according to the embodiment and a configuration of the apparatus thereof, a configuration of the chemical mechanical polishing apparatus applied thereto, is described first. In FIG. 5, chemical mechanical polishing apparatus 1 mainly comprises platen 2 and polishing head 3. The platen 2 is formed disc-like and revolving shaft 4 is connected in the center of the undersurface. The platen 2 rotates in the direction of arrow-head A by the drive of motor 5. Polishing pad 6 is stuck on the upper surface of the platen 2, and slurry which is blend of polishing agents and chemicals is supplied on the polishing pad 6 from a nozzle which is not illustrated.

The polishing head 3 mainly comprises control means, such as head body 7, carrier 8, retaining ring 9, retaining ring pressing means 10, elastic sheet 11, carrier pressing means 16, and air, as shown in FIG. 6.

The head body 7 is formed in disc-like shape smaller than the platen 2, and revolving shaft 12 (refer to FIG. 5) is connected in the center of the upper surface. The head body 7 is attached pivotally to the revolving shaft 12, driven by a motor not illustrated, and rotates in the direction of arrow-head B of FIG. 5.

The carrier 8 is formed in disc-like shape and disposed in the center of head body 7. Dry plate 13 is provided between the upper surface center part of this carrier 8 and the central lower part of head body 7, and the rotation thereof is transmitted from head body 7 via pins 14 and 14.

Between the central lower part of the dry plate 13 and the top center of the carrier 8, actuation transformer body 15a is fixed, and further, core 15b of actuation transformer 15 is fixed to the top center of the carrier 8, and with these connected with a control section not shown, a polished condition signal of the conductive film comprising Cu etc. formed on wafer W (lower part side of FIG. 6) is outputted to the control section.

Carrier pressing member 16a is provided in an upper surface peripheral edge part of the carrier 8, and, as for the carrier 8, thrust is transmitted from carrier pressing means 16 via the carrier pressing member 16a.

Air outlet 19 for injecting air from air float line to elastic sheet 11 is provided in the undersurface of the carrier 8. The air supply pump 21 which is an air supply source is connected to the air float line 17 via air filter 20 and automatic switching valve V1. Blow off of the air from the air outlet 19 is performed by switchover of the automatic switching valve V1.

Hole 22 for a vacuum and for blowing off DIW (pure water) or air as required is formed in the undersurface of the carrier 8. Suction of the air is performed by the drive of vacuum pump 23, and automatic switching valve V2 is provided in vacuum line 24, and feeding of the vacuum and DIW is performed by switchover of the automatic switching valve V2 via the vacuum line 24.

Air feeding from the air float line 17 and the feeding, etc. of the vacuum operation and DIW from vacuum line 24, are performed with a command signal from a control section.

The carrier pressing means 16 is disposed at the circumference of the central part of the head body 7 undersurface, and transmits thrust to carrier 8 connected thereto by giving thrust to carrier pressing member 16a. The carrier pressing means 16 comprises preferably air back 25 made from a rubber sheet which expands and shrinks by intake and exhaust of air. An air supply mechanism not shown for supplying air is connected with the air back 25.

The retaining ring 9 is formed in ring shape, and is disposed at the outer circumference of carrier 8. This retaining ring 9 is attached to retainer ring holder 27 provided in polishing head 3, and the elastic sheet 11 is stretched at the inner periphery thereof.

The elastic sheet 11 is formed in a circle configuration, and a plurality of hole 22 are trepanned. The elastic sheet 11 is stretched and mounted inside retaining ring 9 by sandwiching a peripheral edge part between retaining ring 9 and retainer ring holder 27.

Air chamber 29 is formed between carrier 8 and elastic sheet 11 at the lower part of carrier 8 where the elastic sheet 11 is stretched and mounted. Wafer W on which the conductive film is formed is pressed by carrier 8 via the air chamber 29. The retainer ring holder 27 is attached to mounting member 30 formed in ring shape via snap ring 31. Retaining ring pressing member 10a is connected with the mounting member 30. To retaining ring 9, thrust from retaining ring pressing means 10 is transmitted via the retaining ring pressing member 10a.

Retaining ring pressing means 10 is disposed at outer peripheral part of the undersurface of head body 7, and presses retaining ring retaining ring 9 connected thereto on polishing pad 6 by giving thrust to retaining ring pressing member 10a. The retaining ring pressing means 10 as well as carrier pressing means 16 also comprises preferably air back 16b made from the rubber sheet. An air supply mechanism not shown for supplying air is connected with the air back 16b.

As shown in FIG. 7 or FIG. 8, estimating device 33 of the polishing completion time point is built into a portion of the upper part of platen 2 in chemical mechanical polishing apparatus 1, or a portion of carrier 8 of polishing head 3, one at a time, respectively. When estimating device 33 of the polishing completion time point is built into the platen 2 side, detection signals such as a characteristic change from estimating device 33 of the polishing completion time point are outputted outside via slip ring 32.

As for estimating device 33 of the polishing completion time point, two or more of estimating device 33 may be incorporated in the portion of the upper part of platen 2, or the portion of carrier 8 of polishing head 3, respectively. Two or more of estimating device 33 of the polishing completion time point are incorporated, and distribution information, etc. of the thickness change of conductive film 28 in the surface of wafer W are acquired by extracting film thickness information in time-serial from the estimating device 33 of the polishing completion time point at the direction-of-rotation front side.

Figure 9A:
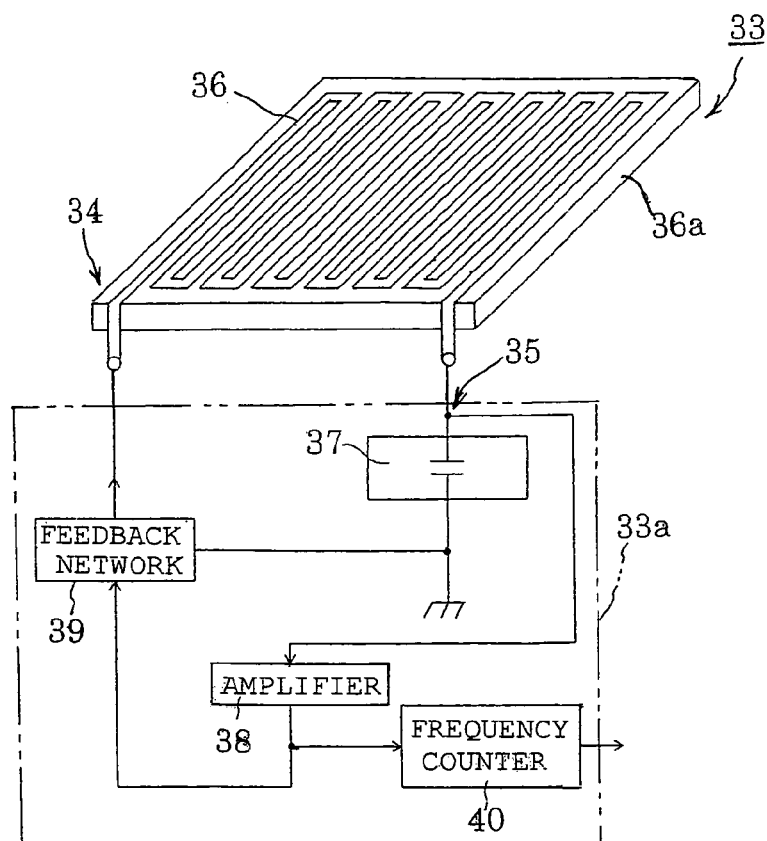
FIG. 9 is an example of a configuration of the estimating device of the polishing completion time point in accordance with the embodiment of the present invention, 9A shows a block diagram, 9B shows another example of a configuration of a planate inductor, and 9C shows a cross sectional view of the planate inductor of FIG. 9B.
Figure 9B:
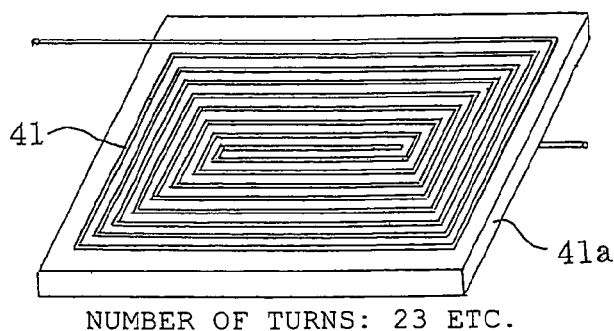

FIG. 9 shows a configuration embodiment of estimating device 33 of the polishing completion time point, and 9A shows a block diagram and 9B shows other embodiment of a planate inductor, and 9C shows a cross sectional view of the planate inductor of FIG. 9B. As for oscillator circuit 35 constituting a main portion of high frequency inductor type sensor 34 in estimating device 33 of the polishing completion time point, lumped-constant capacitor 37 having capacitance Co is connected in series to two-dimensional planate inductor 36 having inductance L, and an LC circuit is constituted. The planate inductor 36 is constituted in a meander form using conductive materials such as Cu, on substrate 36a such as a rectangular shape comprising insulating materials.

Figure 9C:
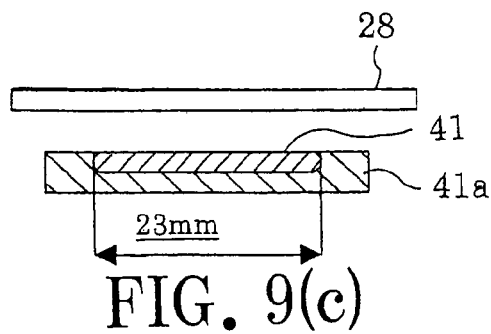

The planate inductor 36 may be constituted in the form of a square-shaped spiral on substrate 41a of rectangular shape like planate inductor 41 shown in FIG. 9B other than the meander type shown in FIG. 9A. Planate inductor 36 may be a round spiral not illustrated. As for two-dimensional planate inductors 36 and 41, the manufacturing thereof is performed by etching etc. after film-forming conducting films, such as Cu, on substrates 36a and 41a comprising insulating materials such as glass epoxy, paper and phenol, etc. Thereby, the manufacturing with the line width thereof extremely minute is possible, and the whole shape, as shown in FIG. 9C, can be miniaturized in rectangular shape etc. which is about 23 mm on a side. A minute magnetic field can be efficiently generated by the miniaturization of planate inductors 36 and 41, and it becomes possible to detect variation behavior with sufficient accuracy around the end point where the conductive film 28 is removed without the magnetic field being made to infiltrate into the inner part of conductive film 28 deeply.

An output signal from the LC circuit is inputted into amplifier 38 comprising an operational amplifier etc., and an output of the amplifier 38 is inputted into feedback network 39 comprising resistances, etc. Oscillator circuit 35 including the planate inductor 36 is constituted by doing the positive feedback of the output signal of feedback network 39 to planate inductor 36.

Figure 10A:
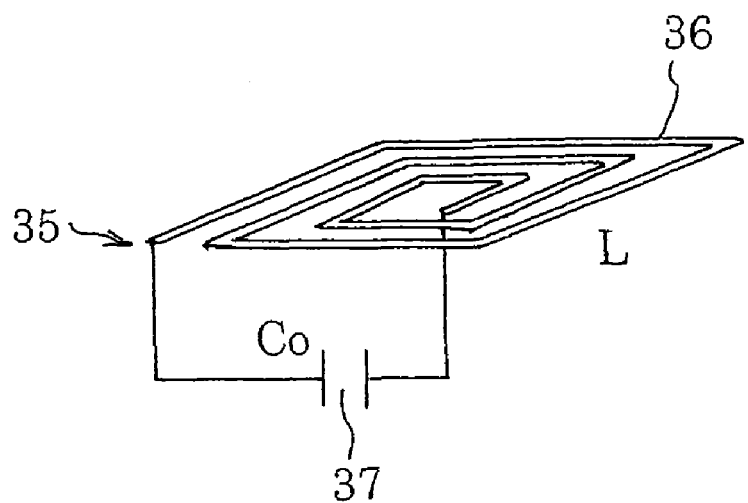
FIG. 10 shows a basic example of a configuration of an oscillator circuit in the estimating device of the polishing completion time point of FIGS. 9, and 10A shows a block diagram and 10B shows an equivalent circuit thereof.
Figure 10B:
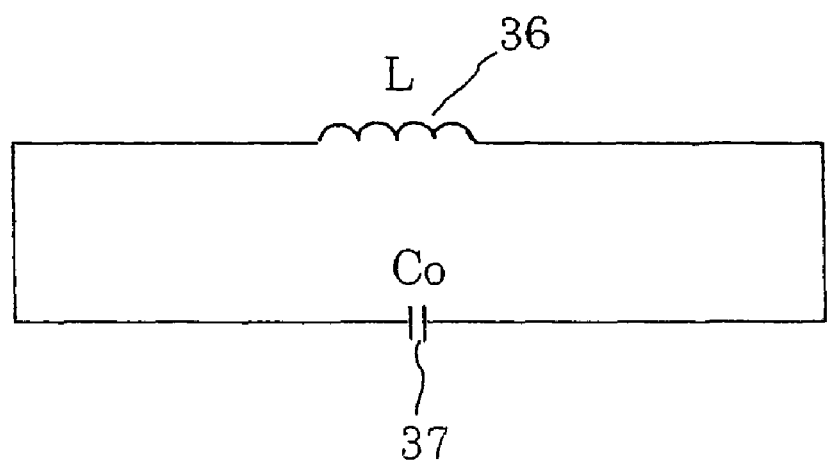

Basically, as shown in the configuration embodiment of FIG. 10, oscillator circuit 35 is an oscillator circuit, such as Kollwitz type, where the oscillation frequency band f is determined by inductance L of planate inductor 36 and capacitance $C_o$ of lumped-constant capacitor 37 showed in following formula (1).

[Formula 1]

$$f = \frac{1}{2\pi\sqrt{LC_o}} \qquad (1)$$

Frequency counter 40 is connected to an output terminal of amplifier 38. A detection signal, etc. having a characteristic variation showing a reference point later mentioned are outputted outside in a digital form from the frequency counter 40. By transmitting the detection signal output in the digital form, effect of noise and attenuation of the output are prevented. Administration facility of the film thickness data is obtained.

Estimating devices 33 of the polishing completion time point is constituted including high frequency inductor type sensor 34 having the planate inductor 36 and the frequency counter 40. By disposing side by side oscillator circuit 35 in high frequency inductor type sensor 34 and frequency counter 40 for monitoring the variation of the oscillation (resonance) frequency, a distributed constant circuit is formed in the wiring and connecting portion between the oscillator circuit 35 and frequency counter 40, and the inductance and capacitance therein is prevented from becoming large unnecessarily, and it becomes possible to detect with sufficient accuracy the change of the magnetic flux brought to the vicinity of the high frequency inductor type sensor 34 accompanying the progress of polishing of conductive film 28.

As for the estimating device 33 of this polishing completion time point, other component parts or circuits except planate inductor 36 are made to integrated circuit to be inner-packaged in package 33a. The planate inductor 36 is covered with a thin insulating film, and is fixed to the surface of package 33a. When the packaged estimating device 33 of the polishing completion time point is built into the chemical mechanical polishing apparatus 1, the packaged estimating device 33 is incorporated so that planate inductor 36 may stand face to face against conductive film 28 of wafer W surface part, as shown in the FIGS. 7 and 8.

The lumped-constant capacitor 37 constituting oscillator circuit 35 is made to be variable in the capacitance thereof, and as for high frequency inductor type sensor 34, the oscillated frequency is made to be able to be selected within the range of the oscillation frequency band.

In accordance with the embodiment of the present invention, based on the flux variation in the case of the film thickness of predetermined conductive film 28 under polishing becomes the film thickness corresponding to skin depth δ of predetermined conductive film 28, detecting the characteristic variation mentioned later is performed. Skin depth δ in predetermined conductive film 28 is given like a formula (2) depending on material of predetermined conductive film 28 and oscillated frequency f of high frequency inductor type sensor 34.

[Formula 2]

$$\delta = \sqrt{\frac{2}{\omega\mu\sigma}} \ (m) \quad (2)$$

ω: 2πf, μ: permeability, σ: conductivity.

Oscillated frequency f of high frequency inductor type sensor 34 is selected so that this skin depth δ may be smaller than the initial film thickness of predetermined conductive film 28 and may be larger than the film thickness of predetermined conductive film 28 in the portion except the embedded part in a polishing ending phase. In the case of material of conductive film 28 of the polishing removal target is Cu, the oscillation frequency band is selected in not less than 20 MHz.

Depth δ to which the magnetic field can infiltrate conductive film 28 is determined by frequency ω according to the relation of the above-mentioned formula (2). When frequency ω becomes large, the depth to which the magnetic field can infiltrate will come to be restricted. In the case of the magnetic field comes not to infiltrate the conductive film, the formation of the eddy current generated by the magnetic field interlinking the conductive film decreases dramatically. As a result, the mutual inductance decreases and the resonance frequency changes greatly.

In the case of the permeability and conductivity of the conductive film are fixed or known, a change point of the eddy current formation is greatly produced at predetermined film thickness as the frequency is being swept. It is because that this change point corresponds to the skin depth of the above equation and is largely divided in the state whether the magnetic field penetrates or not in the film thickness corresponding to the skin depth δ. As a result, the critical frequency at the case where the magnetic field penetrates or not penetrate and the amount of film thickness has a definite correlation relationship. Calculating the correlation relationship in advance for the wafer having a known conductive film, and measuring critical frequency of the actually evaluating wafer based on the correlation relationship, it becomes possible to calculate the film thickness value.

Here, as a method of calculating the film thickness value by calculating the critical frequency, as shown in Japanese Patent Laid-Open No. 08-285515, spectrum analyzer which can sweep a frequency may be used as an oscillator, for example. In this case, a resonance peak exists in the characteristic frequency ω relevant to the tank circuit and the metal film on the substrate under monitor. The total inductance L changes corresponding to the state of the film thickness and the Q factor changes in the case of the metal film exists. The variation may be monitored.

Besides, as shown in Japanese Patent Laid-Open No. 2005-227256, forming an impedance bridge and monitoring the impedance change of the coil, the conductive film conditions may be monitored. A method of monitoring the eddy current induced in the film becomes attainable easily by such a well known technology. However, the portion in which these methods and the present invention differ deterministically, differs greatly fundamentally depending on whether the monitor is carried out by using the portion where the magnetic field of given high frequency penetrates the conductive film or not, and by using the inductance and impedance of the circuitry in the portion, based on depending on a shape of a sensor and a frequency band to be used and the skin effect in the conductive film.

In the present invention, forming the state where magnetic flux penetrates the conductive film relatively and the state where the magnetic flux does not penetrate relatively by using the planate inductor, the detection is performed based on the change of state. Since the change of state appears vividly by variations of the circuitry such as the maximum point of inductance and the maximum point of impedance, this may just be detected.

In Japanese Patent Laid-Open No. 2005-227256, it is stated that the eddy current in a zone where the diameter is large reduces spatial resolution. Further, it is stated that the eddy current in the zone where the diameter is large is made small by providing a reversely-winded coil outside. On the other hand, in the present invention, the magnetic flux exists dispersedly in the conductor film, and since the magnetic flux does not enter into the conductor film by means of the skin effect in the portion with the large diameter, the eddy current is scarcely generated therein.

Here, the above "the film thickness corresponding to the skin depth" and "the flux change arisen according to the skin effect" are described using FIGS. 11A to 11D. FIG. 11 shows a result of electromagnetism simulation with respect to the direction in which the magnetic field generated from the coil is disposed on the conductive film (an arrow-heads, at the lower part in each FIG. 11A to 11D). This shows the case where the current flows into the coil becomes the maximum. FIG. 11A shows the case that the oscillated frequency from the sensor is 1 MHz and the film thickness of the conductor film is 0.2 μm. FIG. 11B shows the case that the oscillated frequency from the sensor is 1 MHz and the film thickness of the conductor film is 1 μm. FIG. 11C shows the case that the oscillated frequency from the sensor is 40 MHz and the film thickness of the conductor film is 0.2 μm, and FIG. 11D shows the case that the oscillated frequency from the sensor is 40 MHz and the film thickness of the conductor film is 1 μm.

As for the setting in the electromagnetism simulation, an inductor which forms the magnetic field is made to be the planate inductor without directivity. The above "the film thickness corresponding to the skin depth" is "the film thickness in which the flux change arises by means of the skin effect." In the oscillated frequency of the sensor is 1 MHz, the magnetic flux on the conductor film existing beneath the coil has turned to the longitudinal direction. In this frequency, even if the film thickness is 1 μm and 0.2 μm, the magnetic flux has penetrated the conductive film (FIGS. 11A and 11B). Thus, in the case of magnetic flux penetrates the conductor film, the eddy current generated in the conductor film decreases with the film thickness decrease as shown in the conventional example. Therefore, in the case of 1 MHz, the skin effect does not appears because of a monotonous behavior in 1 μm or less of the film thickness, but "the film thickness corresponding to the skin depth" is considered to be thicker than at least 1 μm.

On the other hand, in the case of the oscillated frequency of the sensor is 40 MHz, the magnetic flux is clearly level in the conductor surface, and the magnetic flux has scarcely entered into an inner part of the conductor in the film thickness of 1 μm (FIG. 11D). It turns out that direction of the magnetic flux which infiltrates the conductor film differs clearly as compared with the case (FIG. 11B) where the film thickness is 1 μm in 1 MHz.

However, when the conductor film becomes thin to 0.2 μm at 40 MHz in the oscillated frequency (FIG. 11C), only a part of the magnetic flux has turned to the conductor film internal direction. This shows that apart of magnetic flux penetrates the conductor film when the thickness of the conductor film becomes certain thinness even if the conductor film is made from Cu.

In the case of the 40 MHz magnetic flux having an alternating variation, corresponding to the skin effect, the penetrating state of the magnetic flux in the conductor film changes. Under the effect which the penetrating magnetic flux increases gradually, the frequency rises abruptly to around about 700 Å. The magnetic flux scarcely penetrates in the case of the film thickness is 1 μm or more. Therefore, when "the film thickness corresponding to the skin depth" is the film thickness of the boundary of whether magnetic flux penetrates, or not to penetrate, it can be said that the thickness is about 1 μm. Also from this, when the oscillated frequency is made high with 40 MHz and the planate inductor is used, the magnetic flux scarcely infiltrate Cu conductor film of 1 μm thickness. This is based on the skin effect.

When the conductivity of Cu is made into 58×106 S/m in the case of the oscillated frequency is 40 MHz in Cu conductor film, the skin depth δ will be 9.34 μm. Calculatively, when the film thickness is 1 μm, the magnetic flux will infiltrate enough the conductor film, but since the planate inductor is used, and therefore, the magnetic flux has no directivity, actually even in the case of the oscillated frequency is 40 MHz and the film thickness is 1 μm, the magnetic field does not infiltrate the conductor film because of the skin effect. A part of the magnetic flux infiltrates in the conductor film as the conductor film becomes thin, and the eddy current is slightly generated. From this, without utilizing the eddy current positively to measure the film thickness, utilizing the magnetic flux leaking out and penetrating slightly owing to the skin effect, when the film thickness becomes thin around the end point, and utilizing the inflection point (maximum point) of the mutual inductance induced in the conductor film, it becomes possible to monitor the film thickness state of the conductor film around the end point.

Figure 12:
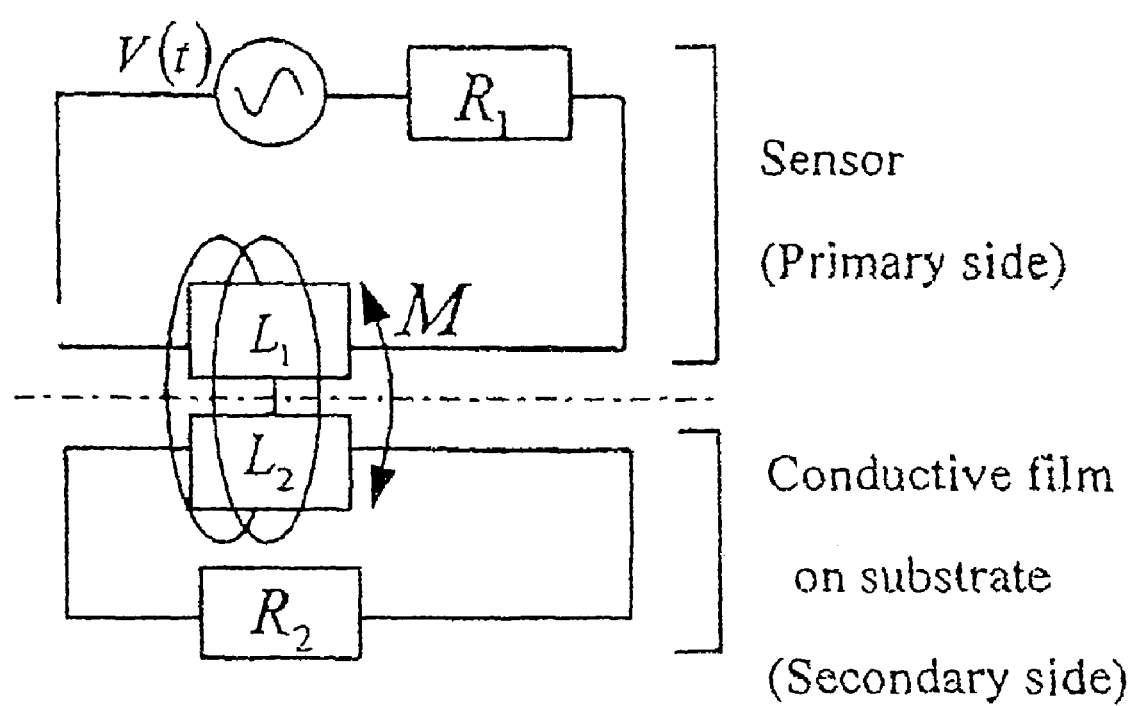
FIG. 12 shows an equivalent circuit diagram for describing the relation of the variation of the eddy current induced in the conductive film and the variation of the impedance of the sensor circuitry in the embodiment according to the present invention.

This mutual inductance corresponds also to the impedance component of the primary side coil (coil which comprises the planate inductor of the sensor circuitry). In calculating the impedance change of the coil-circuitry (sensor circuitry), calculated is the relation between the change of the eddy current induced in the conductor film and the coil side impedance change. In the case of an equivalent circuit is formed as shown in FIG. 12, and each structure member is set up, the circuit equation is expressed as follows.

[Formula 3]
$$L_1 \frac{di_1}{dt} + M \frac{di_2}{dt} + R_1 i_1 = v \quad (3)$$

[Formula 4]
$$L_2 \frac{di_2}{dt} + M \frac{di_1}{dt} + R_2 i_2 = 0 \quad (4)$$

Here, $i_1$ and $i_2$ are currents which flow in the primary side and the secondary side, respectively, and it is assumed that the voltage of v is impressed to the coil of the primary side. In the case of an alternating current with certain angular frequency ω, the equations are as followed:

[Formula 5]
$$i_1 = \mathrm{Re}(I_1 e^{j\omega t}) \quad (5)$$

[Formula 6]
$$i_2 = \mathrm{Re}(I_2 e^{j\omega t}) \quad (6)$$

[Formula 7]
$$v = \mathrm{Re}(V e^{j\omega t}) \quad (7)$$

and equations (3) and (4) shown above are expressed as follows.

[Formula 8]
$$\begin{bmatrix} R_1 + j\omega L & j\omega M \\ j\omega M & R_2 + j\omega L_2 \end{bmatrix} \begin{bmatrix} I_1 \\ I_2 \end{bmatrix} = \begin{bmatrix} V \\ 0 \end{bmatrix} \quad (8)$$

When this formula is solved, the following formula is acquired.

[Formula 9]
$$I_1 = \frac{R_2 + j\omega L_2}{(R_1 + j\omega L_1)(R_2 + j\omega L_2) + \omega^2 M^2} V \quad (9)$$

[Formula 10]
$$I_2 = \frac{-j\omega M}{(R_1 + j\omega L_1)(R_2 + j\omega L_2) + \omega^2 M^2} V \quad (10)$$

Impedance Z seen from the coil side is as follows.

[Formula 11]
$$Z = \frac{V}{I_1} = R_1 + j\omega L_1 + \frac{\omega^2 M^2}{R_2 + j\omega L_2} \quad (11)$$

[Formula 12]
$$Z = \left( R_1 + \frac{R_2 \omega^2 M^2}{R_2^2 + \omega^2 L_2^2} \right) + j\omega \left( L_1 - \frac{L_2 \omega^2 M^2}{R_2^2 + \omega^2 L_2^2} \right) \quad (12)$$

Since it is considered that resistance $R_1$ at the side of the coil is almost zero, the real part of impedance Z is found to be proportional to and corresponding to the square of mutual inductance M arisen according to the eddy current induced in the conductor film. Therefore, here, the change amount of mutual inductance M, i.e., the variation of the eddy current induced in the conductive film, is shown as the variation of the impedance real part of the primary side sensor circuitry.

Figure 13:
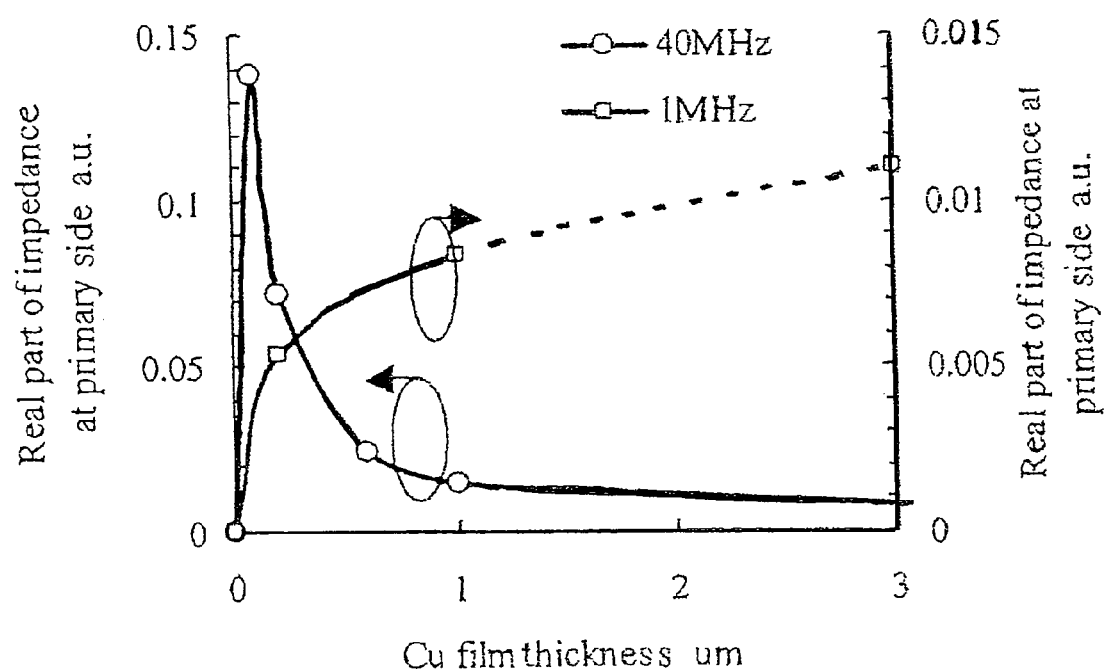
FIG. 13 is a characteristics figure showing film thickness dependency of the sensor circuitry impedance real part when using the planate inductor in the embodiment according to the present invention.

A result obtained by two-dimensional electromagnetism simulation is shown in FIG. 13 regarding to the film thickness dependency of the impedance real part in the case of using the planate inductor. In the case of 40 MHz, the inflection point exists in 0.1 μm or less, and the impedance abruptly decreases after that. In the case of 1 MHz, the figure is found to be decreasing monotonously depending on the film thickness. This shows that the inflection point in main subject appears, in the first, depending on the size of the frequency dealt. It is understood from the variation of the direction of the magnetic flux that the appearance of such inflection point is owing to the effect of the skin effect as shown in previous FIG. 11.

However, if only the frequency is 40 MHz and an inductor shape is made to be the planate inductor, even if it said that the inflection point appears under the effect of the skin effect, it is not necessarily right. Here, by the effect of the skin effect, the state where the magnetic field penetrates relatively the conductor film and the state where the magnetic field does not penetrate relatively the conductor film are formed, and when the evaluation is performed according to the difference therebetween, if it is said that only the frequency exists as a parameter made into a means to make the skin depth corresponding to the film thickness change, it is not necessarily right. Means for changing the effect of the skin effect are a distance of the conductor film and the inductor, a volume of the inductor, and also a shape of the inductor. As the case, in the case of the planate inductor is fully brought close to the conductive film, the confirmation by the two-dimensional finite element simulation has been carried out similarly. Here, the planate inductor was brought close to $\frac{1}{1000}$ rather than the distance shown previously, and was set to 2.4 μm. The computation was performed making the volume of the coil also $\frac{1}{1000}$ and the radius 11 μm. Likewise, when computing with the frequency of the coil being 40 MHz, and with the conductor film being Cu with the thickness of 1 μm, even if the film thickness is 1 μm, on the contrary, much magnetic flux has penetrated. However, when the frequency is pulled up even to 1 GHz, almost all magnetic flux come not to penetrate. In the case of the coil diameter is made into $\frac{1}{1000}$, and distance between the coil and the conductive film is made to be $\frac{1}{1000}$ likewise, when the variation of the primary coil side impedance real part is shown, even if it is 40 MHz in frequency, it turns out that there is no inflection point. When the frequency is raised to 1 GHz, the inflection point will arise at around 1 μm. It turns out that the inflection point arose owing to the effect of the skin effect and also from the direction of the magnetic field which enters in the conductor film as previously mentioned. This shows that the position of the inflection point corresponding to the film thickness changes also with volume of the coil, the shape, or the distances between the coil and the conducting film.

Even if the position of the inflection point shifts with the shape of the coil, volume, and distance, the behavior in which the position of the inflection point changes, by changing the frequency, according to the frequency in a similar manner as was expected exists as it is. Here, the position of the inflection point is shifted with the frequency, the shape of the coil, the volume, the distance, etc. Therefore, for example, to say that the frequency band to be used is a well alike zone, it cannot be said that the principle is the same. As a point, even if it is in what kind of state (the coil shape and the frequency band), the state where the magnetic field penetrate relatively and the state of not penetrating relatively are created by rationalizing parameters which influence the skin effect, and the critical state based on the skin effect is used effectively, and the reference part changing dramatically is made to be formed, and the calculation for the film thickness with the reference part has attained.

From the above experimental result, for forming the inflection point in response to the effect of the skin effect, it is not saying that what is necessary is to make the frequency high and to just merely use the planate inductor. It also becomes important keeping proper the distance of the coil (the planate inductor) and the conductive film, the volume of the coil, etc. Values resulting from the physical properties of the material, such as conductivity, permeability, etc. of the polishing object film have been clear from the waveform in the case of polishing tungsten similarly.

Therefore, the utilization of the behavior referred to as magnetic flux infiltrating the conductive film, or not infiltrating according to the skin effect, can be attained by selecting properly the frequency, the shape of the inductor and the volume, the distance between the inductor and the conductive film, and the conductivity and permeability of the conductive film. It is made to be the main point of the present invention to set up so that the inflection point under the effect of such skin effect may appear around end point detection, to set up the algorithm detecting the inflection point, and to find out newly a proper method for estimating the polishing completion point with sufficient accuracy.

The points which are greatly different compositionally from those of the conventional arts shown previously, are as follow: (a) having used the two-dimensional planate inductor in which the directivity is eliminated in the magnetic field thereof, and the magnetic field is not made to infiltrate positively in the conductive film by means of the skin effect at the polishing early phase, instead of an inductor such as a ferrite core shaping magnetic fields, (b) having set up the frequency highly to the extent that the skin effect works, (c) having rationalized the shape and volume of the primary side inductor, and the distance between the inductor and the conductive film for removal to the extent that the skin effect works in consideration of the conductivity and permeability of the conductive film, and (d) having set up the planate inductor, the frequency, the distance between the planate inductor and the conductive film in consideration of the critical depth based on the material of the polishing object film, into which the magnetic flux infiltrates.

Conventionally, there has been nothing estimating the polishing completion point based on setting up each component of apparatus in the state where the effect of such skin effect appears, and forming intentionally the appearance of the characteristic variation accompanied by the inflection point based on such skin effect. A method for using existence of the peak skillfully and estimating the polishing completion point by making the portion of the peak into the reference position has not been shown conventionally. As the prominent effect which is not in conventionally, as for the consumption portion of the eddy current, by obtaining the characteristic variation accompanied by the inflection point, such as whether the eddy current is consumed in the conductive film, or whether there arises the state where the magnetic field leaks to elements without being consumed in the conductive film, it is possible to understand notably the state with respect to the infiltration of the magnetic field. However, in a conventional method, it is considered as the large difference that the state with respect to the infiltration of the magnetic field into the elements is not known, and damages by means of the energy of the magnetic field to the elements is not taken into consideration, and so on. The present invention is based on the hardware and detection algorithms constituted based on the difference in such clearly different operation effect.

Figure 14:
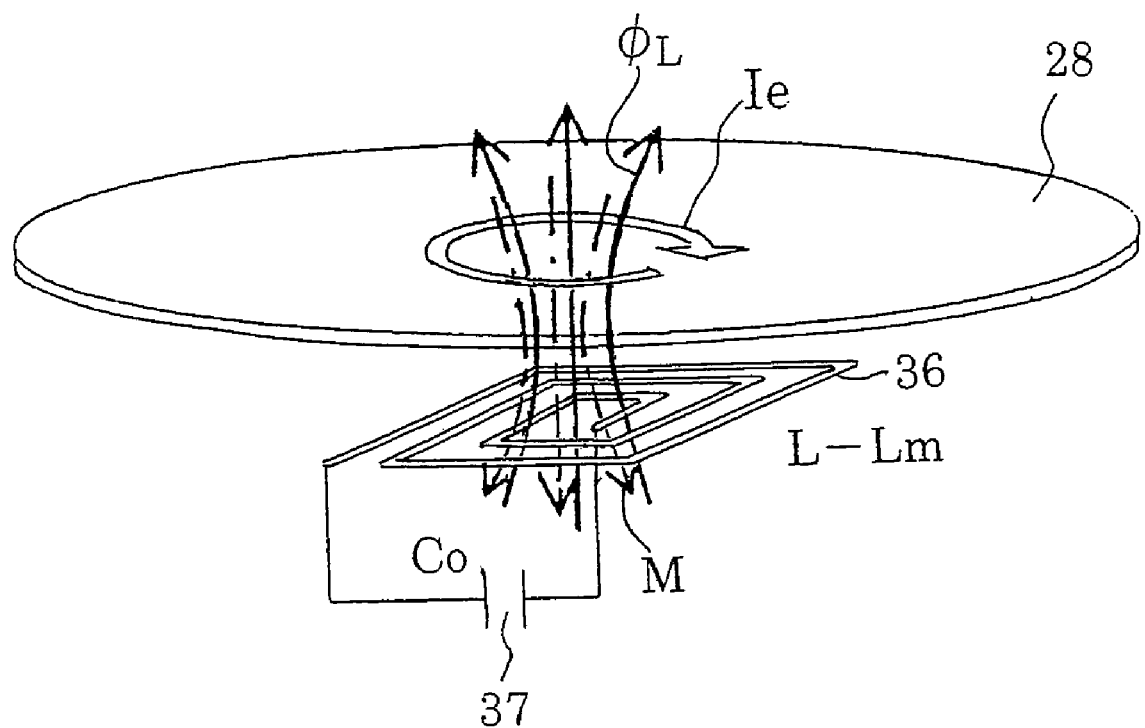
FIG. 14 shows a block diagram for describing variation and operation of inductance by means of the magnetic field generated by the electromagnetic coupling in the high frequency inductor type sensor in the embodiment according to the present invention.

Next, a polishing action of the chemical mechanical polishing apparatus incorporating the estimating device of the polishing completion time point constituted as mentioned above, and an estimation method of the polishing completion time point, are described using FIG. 14 and FIGS. 15A to 15E, and FIGS. 16A to 16E as a comparative example of FIG. 15. FIG. 14 is an figure for describing variation operations of the inductance by means of the magnetic field generated by electromagnetic coupling in the high frequency inductor type sensor, and FIG. 15 shows examples of variations of the magnetic flux and the eddy current accompanying the removal by polishing of the conductive film and a combination figure for describing the detection operation of the film thickness reference point, where 15A to 15D shows the magnetic flux and the examples of the variations of the eddy current accompanying the removal by polishing of the conductive film, and 15E is a characteristics figure showing an example of the variation of the resonance frequency against the thickness change of the conductive film. In FIGS. 15A to 15D, planate inductor 36 is displayed as a spiral form in order to be seen easily.

First, polishing head 3 in chemical mechanical polishing apparatus 1 is placed on wafer W having conductive film 28 not polished under standby at a prescribed spot by a moving mechanism not illustrated. By making vacuum line 24 of the polishing head 3 operate, and making air chamber 29 of the elastic sheet 11 undersurface into vacuum via vacuum aperture 19a and hole 22 (vacuum hole), the wafer W having the conductive film 28 not polished is absorbed and held, polishing head 3 absorbing and holding the wafer W having the conductive film 28 not polished is carried on platen 2 by means of the moving mechanism, and the wafer W is placed on platen 2 so that conductive film 28 may adjoin polishing pad 6 face to face.

When polishing work of conductive film 28 of the wafer W upper part is completed, the vacuum line 24, again, absorbs and holds the wafer W by the polishing head 3 with actuation thereof, and used also when conveying to cleaning equipment not illustrated.

Subsequently, actuation of the vacuum line 24 is released, and air is supplied to air back 25 from a pump which is not illustrated to swell the air back 25. At the same time, air is supplied to air chamber 29 from air outlet 19 provided in carrier 8. Thereby, the internal pressure of air chamber 29 becomes high.

By swelling the air back 25, conductive film 28 of the wafer W upper part and retaining ring 9 is pressed to polishing pad 6 by a predetermined pressure. Platen 2 is rotated in the direction of arrow-head A of FIG. 5 in this state, and at the same time, polishing head 3 is rotated in the direction of arrow-head B of FIG. 5, slurry is supplied from a nozzle not illustrated on rotating polishing pad 6, and predetermined conductive film 28 on the wafer W upper part is polished.

Here, the case where the film thickness is made to be changed to the thin side with the frequency fixed is considered. As follows, by magnetic flux formed by planate inductor 36 in high frequency inductor type sensor 34, the thickness change of predetermined conductive film 28 accompanying polishing is monitored, and characteristic variation 42 becoming a reference point is detected.

Figure 15A:
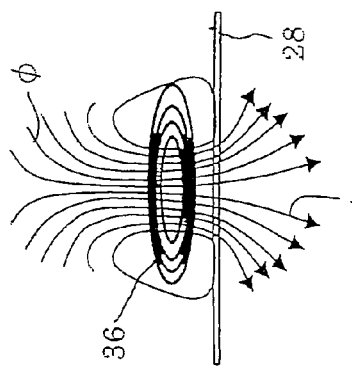
FIG. 15 is a combination figure for describing examples of a variation of the magnetic flux, etc. accompanying the removal by polishing of the conductive film based on the chemical mechanical polishing apparatus of FIG. 5, and the detection operation of the film thickness reference point, and 15A to 15D show examples of the variation of the magnetic flux, etc. accompanying the removal by polishing of the conductive film, and 15E is a characteristics figure showing a example of the variation of the resonance frequency against the thickness change of the conductive film.

Planate inductor 36 is driven by the high frequency oscillated from oscillator circuit 35, and magnetic flux φ changing in terms of time corresponding to the period of the high frequency is generated from the planate inductor 36. Magnetic flux φ induced in predetermined conductive film 28 in the polishing early phase, passes only through the zone of the skin depth δ almost in parallel along the film surface, and infiltrating of magnetic flux φ into the zone beyond skin depth δ in predetermined conductive film 28 is avoided (FIG. 15A). The resonance frequency oscillated from high frequency inductor type sensor 34 is also maintained constantly not related to the thickness change of predetermined conductive film 28 (a zone of FIG. 15E).

Figure 15B:
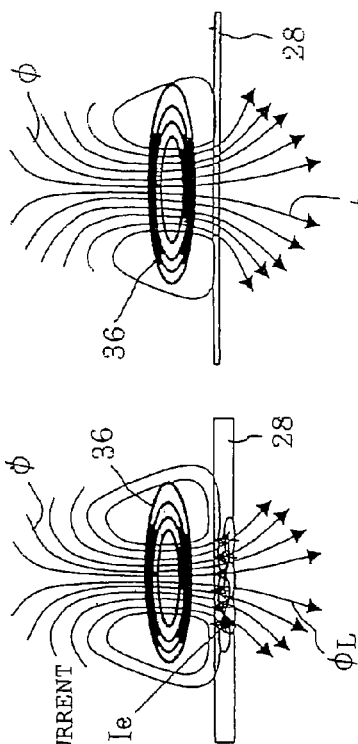

When polishing progresses and predetermined conductive film 28 becomes the film thickness equivalent to the skin depth δ or near that, a part of magnetic flux φ penetrates predetermined conductive film 28, and magnetic-leakage-flux φL begins to arise. Magnetic flux φ which does not penetrate predetermined conductive film 28 passes almost in parallel through the film surface as it is. In proportion to magnetic-leakage-flux φL number penetrated in predetermined conductive film 28, eddy current Ie is generated (FIG. 15B).

Figure 15C:
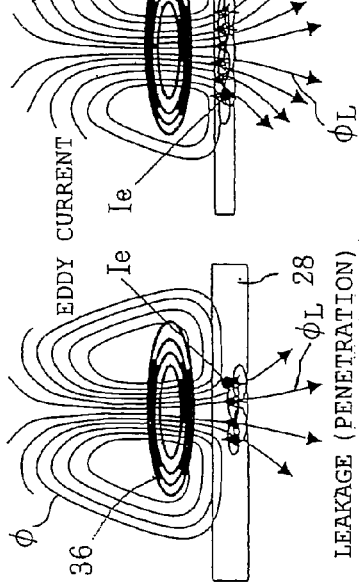

When polishing furthermore progresses, magnetic-leakage-flux φL increases, eddy current Ie is generated in the wide zone in alignment with the film surface of conductive film 28 (FIG. 15C). Eddy current Ie generated in the wide zone makes magnetic field M further, as shown in FIG. 14, and the magnetic field M operates so that magnetic flux φL generated from the original planate inductor 36 may be negated. As a result, by magnetic field M which conductive film 28 formed, mutual inductance Lm increases, inductance L on appearance of the original planate inductor 36 reduces. As a result, oscillated frequency f oscillated from high frequency inductor type sensor 34 increases like the formula (13).

[Formula 13]

$$f = \frac{1}{2\pi\sqrt{(L-Lm)C_o}} \quad (13)$$

Figure 15D:
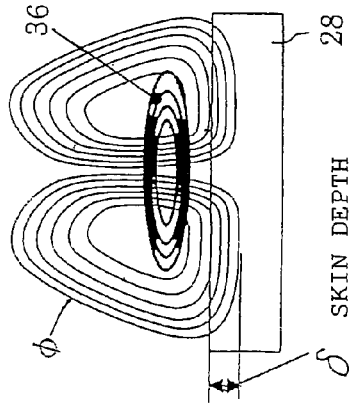
Figure 15E:
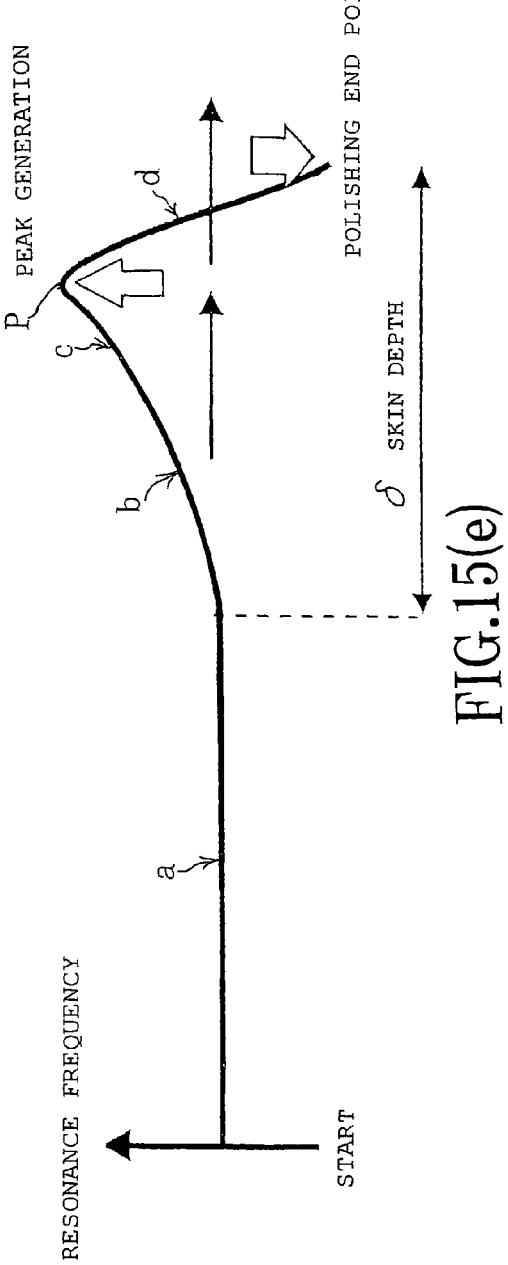

Therefore, by generation of the mutual inductance, the inductance in the sensor circuitry decreases equivalently, and the resonance frequency oscillated from high frequency inductor type sensor 34 increases (b and c zones of FIG. 15E).

Furthermore, magnetic-leakage-flux φL increases to be saturated according to the progress of polishing. However, eddy current Ie decreases quickly with decreasing of the film thickness volume of predetermined conductive film 28 (FIG. 15D). The mutual inductance also decreases quickly by this rapid decreasing of the eddy current Ie. The rapid decreasing of this mutual inductance leads to lowering of decrement Lm of inductance in the formula (13). The inductance in sensor circuitry increases equivalently as a result, and the resonance frequency oscillated from high frequency inductor type sensor 34 decreases quickly (d zone of FIG. 15E).

Thus, after the film thickness of predetermined conductive film 28 is equivalent to the skin depth δ or near that, with progress of polishing, eddy current Ie is generated to increase, and subsequently decreased rapidly, and the inductance in the sensor circuitry once decreases and starts an increase after that. By this behavior, in the waveform of the resonance frequency oscillated from high frequency inductor type sensor 34, characteristic variation 42 with the inflection point (peak) P accompanied by a steep rise and steep lowering is generated. The estimation of the polishing completion time point is performed based on this characteristic variation 42 accompanied by the inflection point (peak) P generated before this polishing completion point.

In addition, a method of estimating the polishing completion time point is not restricted to the method of using the inflection point (peak) P in characteristic variation 42. Even by using at least any of the rise start point, the increasing rate, an increasing amount, or change amount of the lowering from the rise, in characteristic variation 42, the estimation of the polishing completion time point can be carried out with sufficient accuracy. In the case of predetermined conductive film 28 is Cu, the amount of the residual film at the time of the inflection point P in characteristic variation 42 being detected, is about 1000 Å. Final polishing etc. are performed against this amount of the residual film, and polishing is completed.

As this final polishing, for example, after polishing film thickness corresponding to the skin depth which is the amount of residual films in the inflection point P with a necessary polishing rate for the polishing time which was set up in advance from inflection point P in the characteristic variation 42, the polishing is made to have been finished. Or, the film thickness corresponding to the skin depth which is the amount of residual films at inflection point P in the characteristic variation 42 is divided with the polishing rate and thereby, the required polishing time after inflection point P is detected is computed, and after the detection of inflection point P, the polishing is performed only the computed polishing time and then is made to have been finished.

Subsequently, the comparative example of FIGS. 16A to 16E is described. In this comparative example, the frequency where the skin depth δ becomes larger than the initial film thickness of conductive film 28 is applied. By such frequency being applied, during monitoring of the thickness change from the polishing early phase to the polishing ending phase, all magnetic flux φ induced by conductive film 28 penetrate this conductive film 28, and magnetic-leakage-flux φL is generated continuously. Therefore, eddy current Ie proportional to the amount of magnetic-leakage-flux φL are generated during monitoring of the thickness change (FIGS. 16A to 16D). Accordingly, large mutual inductance is generated between conductive film 28 and the planate inductor by this eddy current Ie, and by decrement Lm of the inductance by means of this mutual inductance, oscillated frequency f oscillated from the sensor becomes like formula (13) from the polishing early phase.

According to decreasing of the film thickness by means of the progress of polishing, eddy current Ie rapidly decreases (FIGS. 16B to 16D), and in connection with this, the mutual inductance decreases, and decrement Lm of the inductance in the formula (13) also decreases. As a result, the inductance of sensor circuitry increases equivalently and the resonance frequency which is oscillated from the sensor decrease in monotone (FIG. 16E).

Thus, since the resonance frequency draw a monotone decreasing curve in the comparative example, although it is possible to estimate the film thickness decrement from the polishing early phase, the polishing completion time point or the state before polishing completion time point cannot be discriminated strictly. For example, when stray capacitance C changes with delicate setting, the resonance frequency of overall FIG. 16E shifts up and down over the overall waveform. Accordingly even in the case that the setting where the frequency becoming certain set frequency is made to be the polishing completion point is performed, if the resonance frequency shifts on the whole, the amount of the film thickness is shifted. Even if the variation from the reference film thickness can be monitored by the eddy current variation, in the case of the reference film thickness calibration is changing, the film thickness to be measured will also vary, and a stable film thickness measurement is impossible. Copper, etc. oxidizes easily, and the conductivity thereof is not stabilized either at the time of measurement of the film thickness which is becoming a reference. Therefore, it is unknown whether the amount of the film thickness is exact.

Next, energy consumption of the magnetic field by means of change of the magnetic flux accompanying the above thickness changes is described using FIGS. 17 to 19. FIG. 17 shows variations of the magnetic flux corresponding to energy consumption of the magnetic field in the embodiment: 17A shows the polishing early phase, 17B shows the polishing middle phase, and 17C shows the polishing ending phase, respectively. FIG. 18 is a comparative example of FIG. 17: 18A shows the polishing early phase, 18B shows the polishing middle phase, and 18C shows the polishing ending phase, respectively. FIG. 19 is for describing the energy consumption of the magnetic field: 19A shows the case of the embodiment, and 19B shows the case of the conventional example as a comparative example, respectively.

Figure 19A:
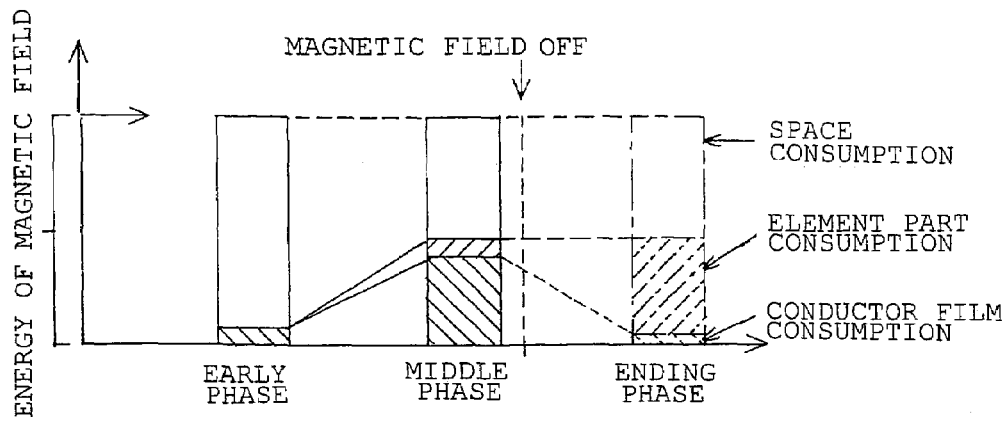
FIG. 19 is a figure for describing energy consumption of the magnetic field, and 19A shows the case of the embodiment, and 19B shows the case of a conventional example as a comparative example of FIG. 19A.

The energy consumption of the magnetic field in the embodiment is described. In the polishing early phase, by the skin effect, magnetic flux φ hardly infiltrates the surface part of conductive film 28, and is rebounded. Accordingly, values of which energy of the magnetic field is consumed within conductive film 28 are little, and the energy of the magnetic field is mostly emitted to space and is consumed therein (FIG. 17A, early phase of FIG. 19A).

The penetrating magnetic flux begins to increase in the polishing middle phase, and the eddy current formed in conductive film 28 of the surface part corresponding to the increasing penetrating magnetic flux also increases, and most energy of the magnetic field is consumed as an eddy current loss (joule thermal loss) in this conductive film 28. Therefore, although some magnetic fields infiltrates element part 43, since most is consumed by conductive film 28, the energy of the magnetic field extended to element part 43, protected by conductive film 28 of the surface part, is reduced substantially (FIG. 17B, middle phase of FIG. 19A).

In the polishing ending phase, as the film thickness decreases according to the progress of polishing, the magnetic field penetrates conductive film 28 further, and the eddy current increases. Since the film thickness itself forming the eddy current decreases by further decreasing of film thickness, the eddy current turns to decrease quickly. By the behavior of this eddy current, characteristic variation 42 (refer to FIG. 15) accompanied by inflection point P is generated in magnetic flux φ induced in conductive film 28. In the eddy current decreasing process in this characteristic variation 42, magnetic flux φ induced in conductive film 28 is reduced or turned OFF. Thereby, the infiltration of the magnetic field into element part 43 accompanying the film thickness decreasing is prevented (FIG. 17C, ending phase of FIG. 19A).

By detecting characteristic variation 42 accompanied by the above-mentioned inflection point P, the polishing completion time point can be estimated accurately. From the time point of characteristic variation 42 accompanied by this inflection point P being detected, it is not necessary to make the magnetic field infiltrate conductive film 28. It is because, in the time point of monitoring accurately characteristic variation 42 accompanied by inflection point P immediately before the completion of polishing, it becomes possible to almost estimate the polishing completion time point accurately in time frame. Therefore, at the time point of this characteristic variation 42 being detected, by making the magnetic flux φ induced in conductive film 28 be reduced or turned OFF, with the formation of the eddy current restrained or without giving a damage to elements and microscopic wirings, etc. in element part 43, it becomes possible to estimate the polishing completion time point.

For example, in the case that the polishing rate is about 5000 Å/min, the film thickness in early phase is 7000 Å, and the polishing-removing of the about 7000 Å needs to be carried out, assuming that the reference polishing rate is 5000 Å/min, polish-processing time becomes required 1.4 min. Meanwhile, if passing the inflection point P of the reference point (the time point of remained 710 Å) in characteristic variation 42 in 75.5 sec, the polishing is found to be performed almost at 5000 Å/min satisfactorily. Therefore, what is necessary will be just to polish remaining 710 Å in 8.5 sec, and the polishing is made to be finished in total 84 sec.

However, supposing the inflection point P of the reference point (the time point of remained 710 Å) is arrived at in 68.6 sec after polishing initiation, for examples, it turns out that the polishing is performed with the polishing rate of abbreviation (7000−710)/(68.6/60), i.e. about 5500 Å/min. Therefore, considering that the polishing progresses at the polishing rate of 5500 Å/min also with respect to the remaining 710 Å, what is necessary will be just to polish in 7.7 sec by calculation of 71(Å)/5500 (Å/min).

Figure 19B:
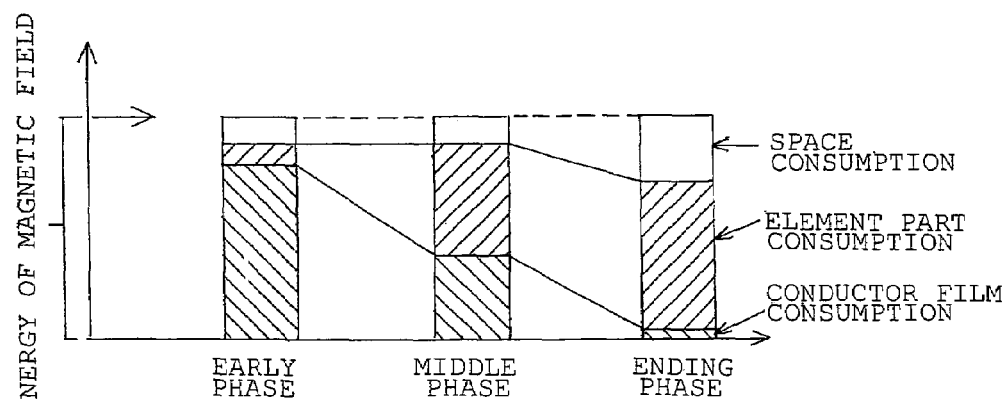

Energy consumption of the magnetic field in the comparative example for the above-mentioned embodiment is described. Since the magnetic field has the directivity in the polishing early phase, almost all magnetic flux $\phi$ penetrates the conductive film of the surface part, and the most energy of the magnetic field is consumed within the conductive film (FIG. 18A, early phase of FIG. 19B).

In the polishing middle phase, the film thickness of the conductive film of the surface part decreases, and while the film thickness decreases, the eddy current formed decreases corresponding to the amount of the film thickness decreased. The amount of the eddy current decrease and Joule's heat generated within the conductive film also decreases proportionately, but the energy of the magnetic field in the phase will be turned, as it is, to element part 43 which exists under the conductive film. That is, the proportionate amount of energy of the magnetic field which was not consumed as eddy current loss (joule thermal loss) in the conductive film, is then turned, as it is, to element part 43, and comes to be consumed in the portion where the conductor film in element part 43 exists (FIG. 18B, middle phase of FIG. 19B).

In the polishing ending phase, almost all magnetic fields infiltrate into element part 43 by decrease of the film thickness, and further a part of the magnetic field penetrates element part 43. Accordingly, although a part of the energy of the magnetic field is consumed in space, the most is consumed within element part 43 (FIG. 18C, ending phase of FIG. 19B).

Figure 20B:
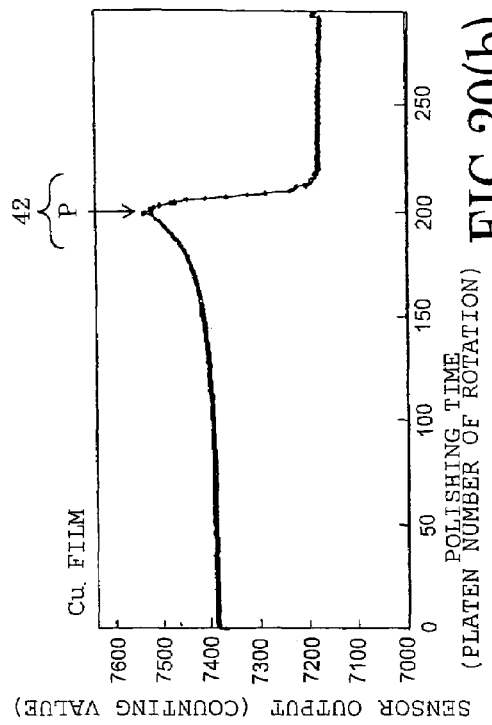
FIG. 20 shows the result of having evaluated the peak which will be the film thickness reference point, with regard to a Cu film and a tungsten (W) film where the conductive film of polishing object differs in respect of the material and the conductivity, in accordance with the embodiment of the present invention, and 20A shows a wafer with the Cu film, 20B shows an example of a change characteristic of the resonance frequency against the film thickness of the Cu film, 20C shows a wafer with the tungsten (W) film, and 20D shows an example of a change characteristic of the resonance frequency against the film thickness of the tungsten (W) film.
Figure 20D:
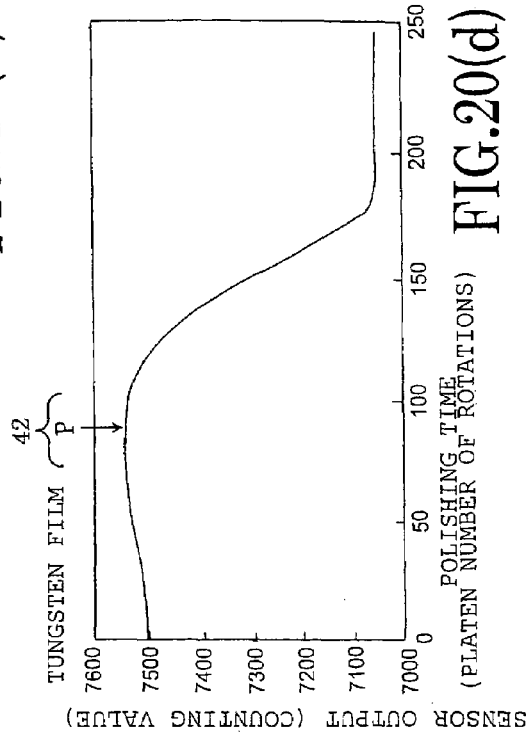
Figure 20A:
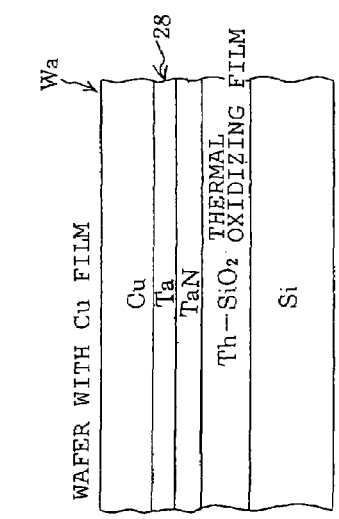
Figure 20C:
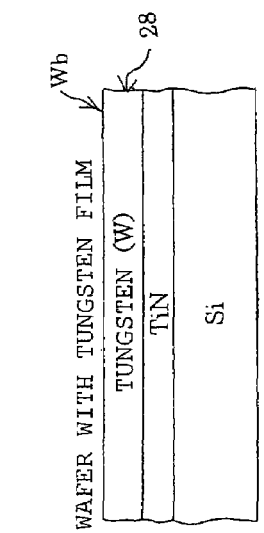

FIGS. 20A to 20D show the result of having evaluated characteristic variation 42 accompanied by the inflection point (peak) P becoming the reference point, with regard to two sorts of wafers Wa and Wb of which the conductive film becoming a polishing object differs in respect of the material and the conductivity. In the FIG. 20, 20A shows wafer Wa with a Cu film, 20B shows a variation characteristic of the resonance frequency for the film thickness of a Cu film, 20C shows wafer Wb with tungsten (W) film, and 20D shows a variation characteristic of the resonance frequency for the film thickness of a tungsten (W) film, respectively. The sensor output of each vertical axis in FIGS. 20B and 20D corresponds to the resonance frequency.

As for both the Cu film and the tungsten (W) film, the resonance frequency increases once with progress of the polishing, and then, rapidly decreases, and characteristic variation 42 accompanied by the inflection point (peak) p is generated. This behavior is clearly remarkable in the Cu film with large conductivity shown in FIG. 20B, compared with the case of tungsten (W) film shown in FIG. 20D.

Figure 21A:
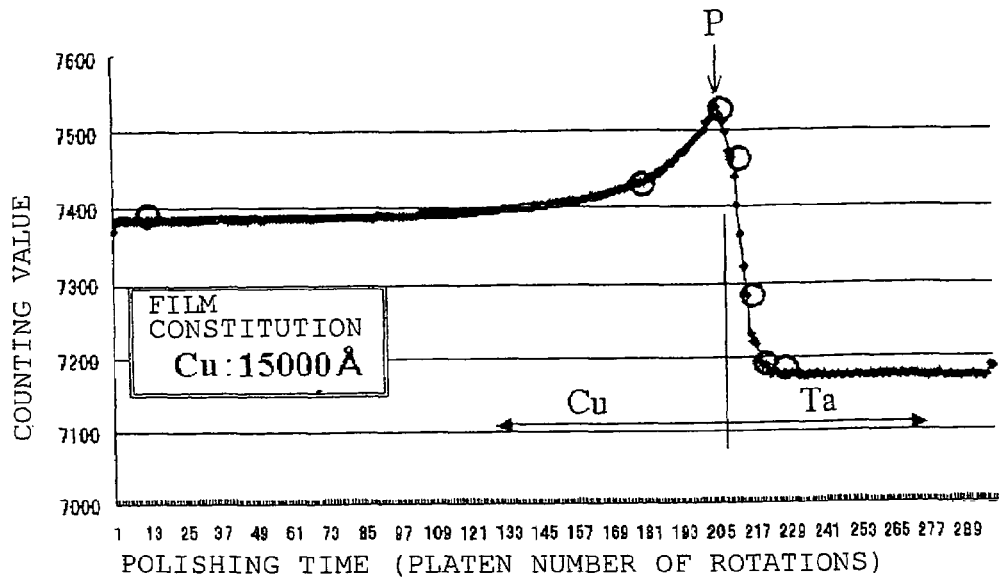
FIG. 21 shows a relation between the film thickness and the resonance frequency in the case of the conductive film of the polishing object is the Cu film, in accordance with the embodiment of the present invention, and 21A shows the related example of the film thickness and resonance frequency with progress of the polishing, and 21B shows the related example of the film thickness and resonance frequency in a static state.
Figure 21B:
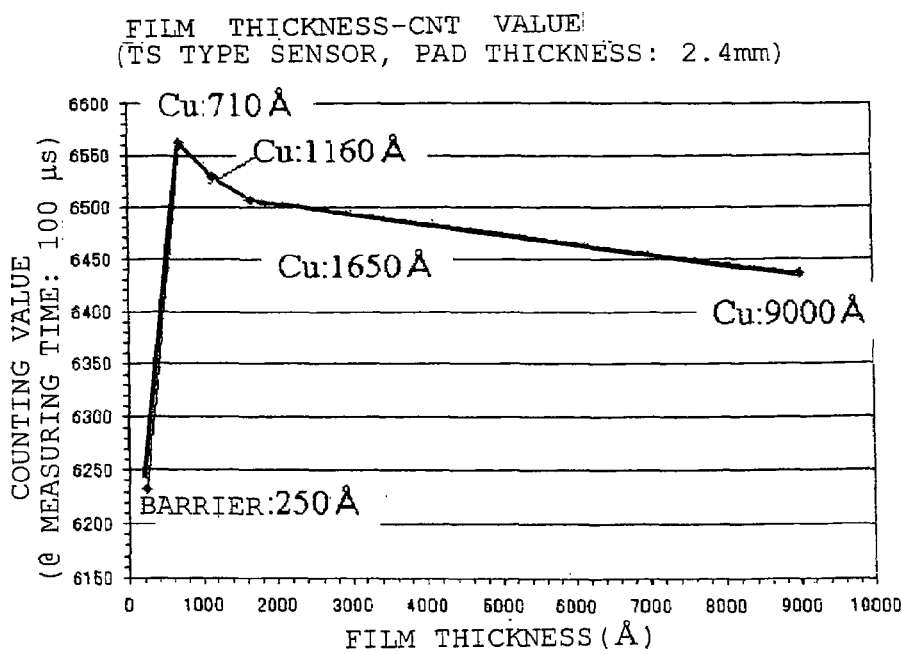

FIGS. 21A and 21B show the relation between the film thickness and the resonance frequency in the case of the conductive film of the polishing object is the Cu film, 21A shows the relation of the film thickness and the resonance frequency accompanying progress of the polishing, and 21B shows the relation of the film thickness and the resonance frequency in a static state. Count values of each vertical axis in FIGS. 21A and 21B correspond to the resonance frequency.

In FIG. 21A, the early phase film thickness of the Cu film is about 1.5 μm (15000 Å). As for the Cu film, the resonance frequency rises gradually from at around about 1 μm (10000 Å) with progress of the polishing, and takes the maximum at around 700 Å, and characteristic variation 42 accompanied by the inflection point (peak) P is detected. The resonance frequency decreases rapidly after having taken the maximum. Thus, as for the Cu film, accurately detected is the remaining film thickness when the inflection point (peak) P in characteristic variation 42 is detected.

In FIG. 21B, the resonance frequency measured against each film thickness of the Cu film in the static condition, shows the maximum at the film thickness of 710 Å. Therefore, the film thickness of the Cu film in which the resonance frequency becomes maximum in the static state almost equal to the film thickness of the Cu film in which the resonance frequency becomes maximum during progress of the above-mentioned polishing.

In the embodiment, the film thickness reference point P is detectable based on at least any of such variations, besides the resonance frequency, as the variation of the mutual inductance, the variation of eddy current Ie, the variation of magnetic-leakage-flux $\phi L$, and the variation of the inductance or impedance of the sensor circuitry in high frequency inductor type sensor 34 by means of the mutual inductance. The variation of the mutual inductance, utilizing the formula (3), can be calculated from the variation of the oscillated frequency of high frequency inductor type sensor 34, and the eddy current Ie can be calculated using the variation of the mutual inductance because eddy current Ie is in proportional relation to the mutual inductance, and the magnetic-leakage-flux $\phi L$ can be calculated using the variation of the eddy current Ie because magnetic-leakage-flux $\phi L$ is in proportional relation to eddy current Ie.

As mentioned above, in the estimation method of the polishing completion time point and the apparatus for the same, from characteristic variation 42 accompanied by the inflection point P before the completion of polishing, the polishing completion time point can be detected accurately.

After detection of characteristic variation 42 accompanied by the inflection point P, by reducing or turning OFF of the magnetic flux induced in predetermined conductive film 28, the strong magnetic flux is prevented from extending on the elements on the device wafer of the conductive film lower part and microscopic wirings, etc.

With progress of the polishing, after predetermined conductive film 28 is equivalent to skin depth δ or near the film thickness thereof, the generation of characteristic variation 42 of the magnetic flux before the polishing completion point can be detected clearly and easily by using at least any of such variations as the eddy current Ie, the mutual inductance, the inductance or impedance of the sensor circuitry, or the resonance frequency which inductor type sensor 34 oscillates.

Having rationalized at least any of the frequency given to planate inductor 36, the inductor shape, or the distance between planate inductor 36 and predetermined conductive film 28, makes the directivity of the magnetic field against the conductive film 28 enable to be set up properly. Therefore, generating the process of increasing and decreasing of the eddy current by means of the skin effect, from the start of removing predetermined conductive film 28 to the termination of the removal, characteristic variation 42 of the magnetic flux just before the polishing completion time point can be made to generate.

In the present invention, any changes and modifications are possible, provided the changes and modifications do not depart from the scope of the present invention, and as the matter of course, the changes and modifications are deemed to be encompassed by the present invention.

DESCRIPTION OF REFERENCE NUMERALS

1 Chemical Mechanical Polishing Apparatus
2 Platen
3 Polishing Head
4 Revolving Shaft
5 Motor
6 Polishing Pad
7 Head Body
8 Carrier
9 Retaining Ring
10 Retaining Ring Pressing Means
11 Elastic Sheet
12 Revolving Shaft
13 Dry Plate
14 Pin
15 Actuation Transformer
16 Carrier Pressing Means
17 Air Float Line
19 Air Outlet
20 Air Filter
21 Air Supply Pump
22 Hole
23 Vacuum Pump
24 Vacuum Line
25 Air Back
27 Retainer Ring Holder
28 Conductive Film
29 Air Chamber
30 Mounting Member
31 Snap Ring
32 Slip Ring
33 Estimating Device of Polishing Completion Time Point
34 High Frequency Inductor Type Sensor
35 Oscillator Circuit
36 Planate Inductor
37 Lumped-constant Capacitor
38 Amplifier
39 Feedback Network
40 Frequency Counter
41 Planate Inductor
42 Characteristic Variation
43 Element Part
P Inflection Point Generated During Characteristic Variation
W wafer
101 Wafer Stage
102 Wafer
103 Coil
104 Sensor
105 Impedance Analyzer (Network Analyzer)

What is claimed is:

1. A film thickness measuring method for measuring a film thickness of a conductive film formed on a substrate, the film thickness measuring method comprising the steps of:
    making one coil be opposed to a surface of the conductive film;
    making a magnetic field made to be induced in the coil by an alternating current supplied to the coil operate on the conductive film;
    increasing an eddy current induced in the conductive film by increasing a frequency of the alternating current in a state a magnetic flux infiltrates the conductive film;
    decreasing the eddy current induced in the conductive film by further increasing the frequency to decrease the magnetic flux penetrating through the conductive film due to a skin effect determined with a material of the conductive film as a factor; and
    finding a film thickness of the conductive film based on a frequency at a changing point of the eddy current induced in the conductive film in the increasing step and the decreasing step.

2. A film thickness measuring apparatus for measuring a film thickness of a conductive film formed on a substrate, comprising:
    means for making a one coil be opposed to a surface of the conductive film;
    means for making a magnetic field made to be induced in the coil by an alternating current supplied to the coil operate on the conductive film;
    means for increasing an eddy current induced in the conductive film by increasing a frequency of the alternating current in a state a magnetic flux infiltrates the conductive film;
    means for decreasing the eddy current induced in the conductive film by further increasing the frequency to decrease the magnetic flux penetrating through the conductive film due to a skin effect determined with a material of the conductive film as a factor; and
    means for finding a film thickness of the conductive film based on a frequency at a changing point of the eddy current induced in the conductive film as in the increasing means and the decreasing means.

3. A film thickness measuring apparatus for measuring a film thickness of a conductive film formed on a substrate, the film thickness measuring apparatus comprising:
    means for making one coil be opposed to a surface of the conductive film;
    means for coupling the coil and a capacitor to form a resonant circuit;
    means for making a magnetic field made to be induced in the coil by an alternating current supplied to the coil operate on the conductive film;
    means for increasing an eddy current induced in the conductive film by increasing a frequency of the alternating current in a state a magnetic flux infiltrates the conductive film;
    means for decreasing the eddy current induced in the conductive film by further increasing the frequency to decrease the magnetic flux penetrating through the conductive film due to a skin effect determined with a material of the conductive film as a factor; and
    means for finding a film thickness of the conductive film based on a frequency at a changing point of the eddy current induced in the conductive film in the increasing means and the decreasing means.

4. A film thickness measuring apparatus for measuring a film thickness of a conductive film formed on a substrate, comprising:
    means for making a coil be opposed to a surface of the conductive film in a process of making a conductive film remove from or deposit on the substrate continuously;
    means for making the magnetic field made to be induced in the coil by an alternating current operate on the conductive film;
    means for forming a state of making the magnetic field not penetrate the film relatively and a state of making the magnetic field penetrate the film relatively, by changing a parameter influencing a skin effect of the conductive film and giving the parameter to the coil; and
    means for measuring a film constitution and various values of the film by measuring a remaining film thickness of the conductive film, a removed film thickness, and those change amount, and a change speed, from a change of an eddy current induced based on the change of state and from variations of various values corresponding to the eddy current.

5. The film thickness measuring apparatus according to claim 4, wherein, in advance, a sample of an actually measured conductive film or a corresponding sample is used, and at the same time changing a parameter influencing the skin effect of the conductive film and giving the parameter to the coil, a state of making the magnetic field not penetrate the film relatively and a state of making the magnetic field penetrate the film relatively are formed, and the induced eddy current influenced by the skin effect or various values corresponding to the induced eddy current are contrasted with a variation of a reference waveform of the sample obtained by measuring in advance, and thereby, a film constitution and various values of the film in the real sample are measured and discriminated.

6. A film thickness measuring method for measuring a film thickness of a conductive film formed on a substrate, the film thickness measuring method comprising the steps of:
making one coil be opposed to a surface of the conductive film;
coupling the coil and a capacitor to form a resonant circuit;
making a magnetic field made to be induced in the coil by an alternating current supplied to the coil operate on the conductive film;
increasing an eddy current induced in the conductive film by increasing a frequency of the alternating current in a state a magnetic flux infiltrates the conductive film;
decreasing the eddy current induced in the conductive film by further increasing the frequency to decrease the magnetic flux penetrating through the conductive film due to a skin effect determined with a material of the conductive film as a factor; and
finding a film thickness of the conductive film based on a frequency at a changing point of the eddy current induced in the conductive film in the increasing step and the decreasing step.

7. A film thickness measuring method for measuring a film thickness of a conductive film formed on a substrate, the film thickness measuring method comprising the steps of:
making one coil be opposed to a surface of the conductive film;
making a magnetic field made to be induced in the coil by an alternating current supplied to the coil operate on the conductive film;
increasing an eddy current induced in the conductive film by decreasing a frequency from a state in which a magnetic field does not infiltrate the conductive film due to a skin effect to hardly cause an eddy current flowing through the conductive film to occur to cause the magnetic flux to start penetrating through the conductive film;
decreasing the eddy current induced in the conductive film by further decreasing the frequency; and
finding a film thickness of the conductive film based on a frequency at a peak of the eddy current obtained through the increasing step and the decreasing step and induced in the conductive film.

8. A film thickness measuring apparatus for measuring a film thickness of a conductive film formed on a substrate, the film thickness measuring apparatus comprising:
means for making one coil be opposed to a surface of the conductive film;
means for making a magnetic field made to be induced in the coil by an alternating current supplied to the coil operate on the conductive film;
means for increasing an eddy current induced in the conductive film by decreasing a frequency from a state in which a magnetic field does not infiltrate the conductive film due to a skin effect to hardly cause an eddy current flowing through the conductive film to occur to cause the magnetic flux to start penetrating through the conductive film;
means for decreasing the eddy current induced in the conductive film by further decreasing the frequency; and
means for finding a film thickness of the conductive film based on a frequency at a peak of the eddy current obtained through the increasing means and the decreasing means and induced in the conductive film.

9. A film thickness measuring method for measuring a film thickness of a conductive film formed on a substrate, the film thickness measuring method comprising the steps of:
making one coil be opposed to a surface of the conductive film;
coupling the coil and a capacitor to form a resonant circuit;
making a magnetic field induced in the coil on the conductive film by an alternating current supplied to the coil operate on the conductive film;
increasing an eddy current induced in the conductive film by decreasing a frequency from a state in which a magnetic field does not infiltrate the conductive film due to a skin effect to hardly cause an eddy current flowing through the conductive film to occur to cause the magnetic flux to start penetrating through the conductive film;
decreasing the eddy current induced in the conductive film by further decreasing the frequency; and
finding a film thickness of the conductive film based on a frequency at an inflection point or peak of the eddy current obtained through the increasing step and the decreasing step and induced in the conductive film.

10. A film thickness measuring apparatus for measuring a film thickness of a conductive film formed on a substrate, the film thickness measuring apparatus comprising:
means for making one coil be opposed to a surface of the conductive film;
means for coupling the coil and a capacitor to form a resonant circuit;
means for making a magnetic field induced in the coil on the conductive film by an alternating current supplied to the coil operate on the conductive film;
means for increasing an eddy current induced in the conductive film by decreasing a frequency from a state in which a magnetic field does not infiltrate the conductive film due to a skin effect to hardly cause an eddy current flowing through the conductive film to occur to cause the magnetic flux to start penetrating through the conductive film;
means for decreasing the eddy current induced in the conductive film by further decreasing the frequency to; and
means for finding a film thickness of the conductive film based on a frequency at an inflection point or peak of the eddy current obtained through the increasing means and the decreasing means and induced in the conductive film.

11. A film thickness measuring method for measuring a film thickness of a conductive film formed on a substrate based on a change of an eddy current induced on the conductive film with a magnetic field induced in one coil opposed to a surface of the conductive film by an alternating current supplied to the coil, the film thickness measuring method comprising the steps of:

increasing an eddy current occurring by decreasing a frequency to change a state in which the magnetic field does not penetrate through the conductive film due to a skin effect determined with a material of the conductive film as a factor to a state in which the magnetic field penetrates therethrough;

turning the eddy current induced in the conductive film to decrease by further decreasing the frequency; and finding a film thickness of the conductive film based on the frequency at a turning point of the eddy current.

12. A film thickness measuring apparatus for measuring a film thickness of a conductive film formed on a substrate based on a change of an eddy current induced on the conductive film with a magnetic field induced in one coil opposed to a surface of the conductive film by an alternating current supplied to the coil, the film thickness measuring apparatus comprising:

means for increasing an eddy current occurring by decreasing a frequency to change a state in which the magnetic field does not penetrate through the conductive film due to a skin effect determined with a material of the conductive film as a factor to a state in which the magnetic field penetrates therethrough;

means for turning the eddy current induced in the conductive film to decrease by further decreasing the frequency; and means for finding a film thickness of the conductive film based on the frequency at a changing point of the eddy current.

13. A film thickness measuring method for measuring a film thickness of a conductive film formed on a substrate based on a change of an eddy current induced on the conductive film with a magnetic field induced in one coil opposed to a surface of the conductive film by an alternating current supplied to the coil, the film thickness measuring method comprising the steps of:

increasing an eddy current occurring by decreasing a frequency to change a state in which the magnetic field does not penetrate through the conductive film due to a skin effect determined with a material of the conductive film as a factor to a state in which the magnetic field penetrates therethrough;

turning the eddy current induced in the conductive film to decrease by further decreasing the frequency; and finding a film thickness of the conductive film by weakening the alternating current to be supplied to the coil when turning the eddy current to decrease.

14. A film thickness measuring apparatus for measuring a film thickness of a conductive film formed on a substrate based on a change of an eddy current induced on the conductive film with a magnetic field induced in one coil oppOsed to a surface of the conductive film by an alternating current supplied to the coil, the film thickness measuring apparatus comprising:

means for increasing an eddy current occurring by decreasing a frequency to change a state in which the magnetic field does not penetrate through the conductive film due to a skin effect determined with a material of the conductive film as a factor to a state in which the magnetic field penetrates therethrough;

means for turning the eddy current induced in the conductive film to decrease by further decreasing the frequency; and means for finding a film thickness of the conductive film by weakening the alternating current to be supplied to the coil when turning the eddy current to decrease.

* * * * *